(12) United States Patent
Yoshizawa et al.

(10) Patent No.: US 12,482,206 B2
(45) Date of Patent: Nov. 25, 2025

(54) AUGMENTED REALITY PROCESSING SYSTEM, INFORMATION DISPLAY DEVICE, AND AUGMENTED REALITY PROCESSING METHOD

(71) Applicant: MAXELL, LTD., Kyoto (JP)

(72) Inventors: Kazuhiko Yoshizawa, Kyoto (JP); Yasunobu Hashimoto, Kyoto (JP)

(73) Assignee: MAXELL, LTD., Kyoto (JP)

( * ) Notice: Subject to any disclaimer, the term of this patent is extended or adjusted under 35 U.S.C. 154(b) by 214 days.

(21) Appl. No.: 18/038,242

(22) PCT Filed: Nov. 30, 2020

(86) PCT No.: PCT/JP2020/044503
§ 371 (c)(1),
(2) Date: May 23, 2023

(87) PCT Pub. No.: WO2022/113342
PCT Pub. Date: Jun. 2, 2022

(65) Prior Publication Data
US 2024/0005619 A1 Jan. 4, 2024

(51) Int. Cl.
*G06T 19/20* (2011.01)
*G06F 3/01* (2006.01)
*G06T 19/00* (2011.01)

(52) U.S. Cl.
CPC ............. *G06T 19/20* (2013.01); *G06F 3/012* (2013.01); *G06T 19/006* (2013.01); *G06T 2219/2004* (2013.01)

(58) Field of Classification Search
CPC ................... G06T 19/20; G06T 19/006; G06T 2219/2004; G06F 3/012
See application file for complete search history.

(56) References Cited

U.S. PATENT DOCUMENTS

| 2016/0055675 A1 | 2/2016 | Kasahara et al. |
| 2017/0068323 A1 | 3/2017 | West et al. |
| 2019/0236849 A1 | 8/2019 | Seshita |

FOREIGN PATENT DOCUMENTS

| JP | 2017-033575 A | 2/2017 |
| WO | 2014/162823 A1 | 10/2014 |
| WO | 2018/025511 A1 | 2/2018 |

OTHER PUBLICATIONS

Fukakusa, JP2017-033575 EPO translation (Year: 2017).*
International Search Report of PCT/JP2020/044503 dated Jan. 12, 2021.

* cited by examiner

*Primary Examiner* — Sing-Wai Wu
(74) *Attorney, Agent, or Firm* — Mattingly & Malur, PC

(57) ABSTRACT

An augmented reality processing system transmits information regarding an augmented reality object(ARO) arranged in a virtual space on the basis of a world-coordinate-system from an information display device to an information processing device. The information processing device arranges a provisional ARO on the basis of the received information about the ARO in a work space on the basis of a terminal-coordinate-system with the information processing device as a reference and displays the provisional ARO on a display of the information processing device, and accepts an edit operation for the displayed provisional ARO and transmits the same to the information display device. The information display device reflects the content of the edit operation in the ARO arranged in the virtual space on the basis of the world-coordinate-system and displays the ARO, on the basis of the received information regarding the edit operation for the provisional ARO.

16 Claims, 24 Drawing Sheets

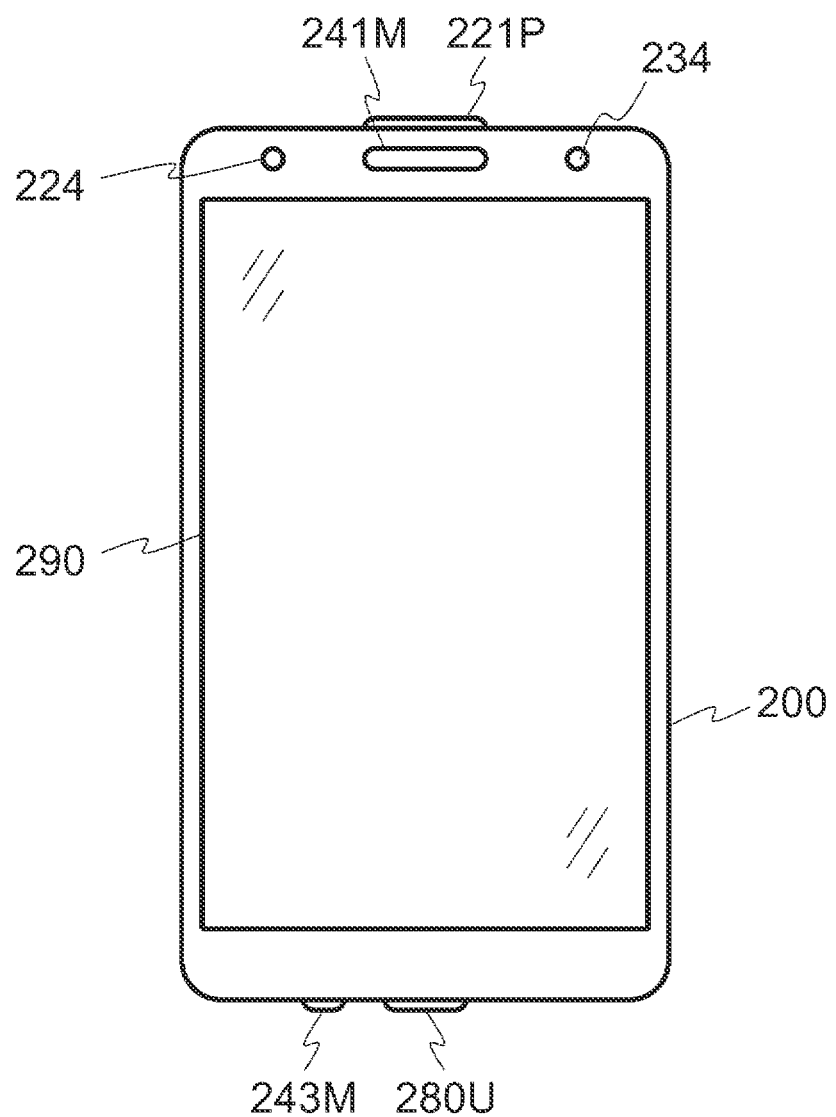

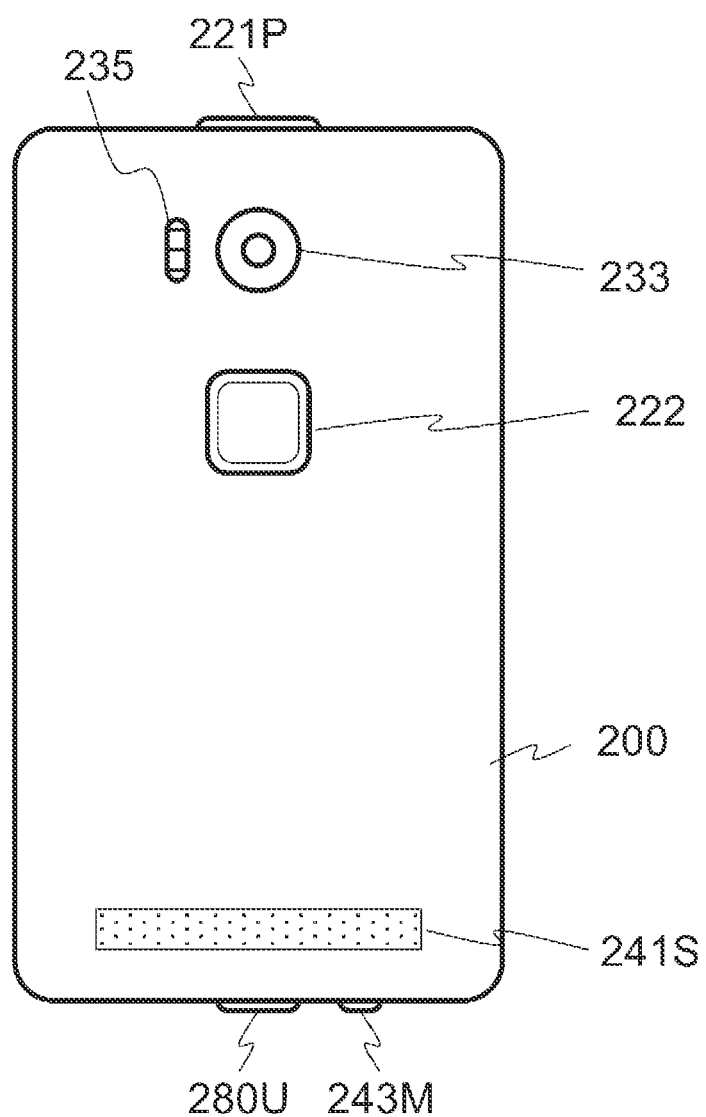

AUGMENTED REALITY PROCESSING SYSTEM, INFORMATION DISPLAY DEVICE, AND AUGMENTED REALITY PROCESSING METHOD

TECHNICAL FIELD

The present invention relates to an augmented reality processing system, an information display device, and a method therefor, and particularly relates to an improvement in edit operability of an augmented reality (AR) object.

BACKGROUND ART

There has been disclosed in Patent Document 1, an information processing device "including a display control unit which displays an image on the basis of a captured image of a real space, an operation unit which accepts the input of an annotation for the image, and a selection control unit which selects whether to associate the above annotation with the position of the above real space or associate it with an object existing in the real space (summary excerpt)".

CITATION LIST

Patent Literature

PTL 1: International Publication No. 2014/162823

SUMMARY OF INVENTION

Technical Problem

In Patent Document 1, since a video of a real space captured by a camera of a wearable terminal is stream-delivered to a tablet terminal (refer to Paragraph 0035 of the same Document), the display range of the tablet terminal changes moment by moment with the movement of a user wearing the wearable terminal (refer to Paragraph 0059 of the same Document). Therefore, when attention is paid to the tablet terminal in order to add an annotation in the case where the user of the wearable terminal and the user of the tablet terminal are the same, the wearable terminal is displaced from the direction of an object and hence the object will not be displayed on the tablet terminal. Therefore, the work of adding the annotation is not efficient.

The present invention has been made in view of the above actual circumstances, and an object thereof is to improve the operability of the work of editing an AR object including an annotation.

Solution to Problem

In order to solve the above problems, the present invention has the configuration described in claims. To take an example, the present invention is an augmented reality processing system comprising: an information display device which displays an augmented reality object; and an information processing device which is performed an edit operation of the augmented reality object, wherein the information display device includes a first display, a first communication device which transmits information to the information processing device and receives information from it, and a first processor, wherein the information processing device includes a second display, a second communication device which transmits information to the information display device and receives information from it, and a second processor, wherein the first processor transmits information about the augmented reality object arranged in a virtual space on the basis of a world coordinate system with a real space as a reference to the information processing device through the first communication device, wherein the second processor arranges a provisional augmented reality object on the basis of the information about the augmented reality object in a work space on the basis of a terminal coordinate system with the information processing device as a reference, displays the provisional augmented reality object on the second display, accepts an edit operation for the displayed provisional augmented reality object, and transmits information about the edit operation for the provisional augmented reality object to the information display device through the second communication device, and wherein the first processor reflects the content of the edit operation in the augmented reality object arranged in the virtual space on the basis of the world coordinate system, on the basis of the information about the edit operation for the provisional augmented reality object.

According to the present invention, it is possible to improve the operability of the work of editing an AR object including an annotation. Incidentally, problems, configurations, and effects other than those described above will be clarified by the following description of embodiments.

BRIEF DESCRIPTION OF DRAWINGS

FIG. 6A is a front view of the tablet terminal.

FIG. 6B is a back view of the tablet terminal.

FIG. 9A is a bird's-eye view showing a state in which the user is viewing the real world with the AR object display function turned on.

DESCRIPTION OF EMBODIMENTS

Figure 1:
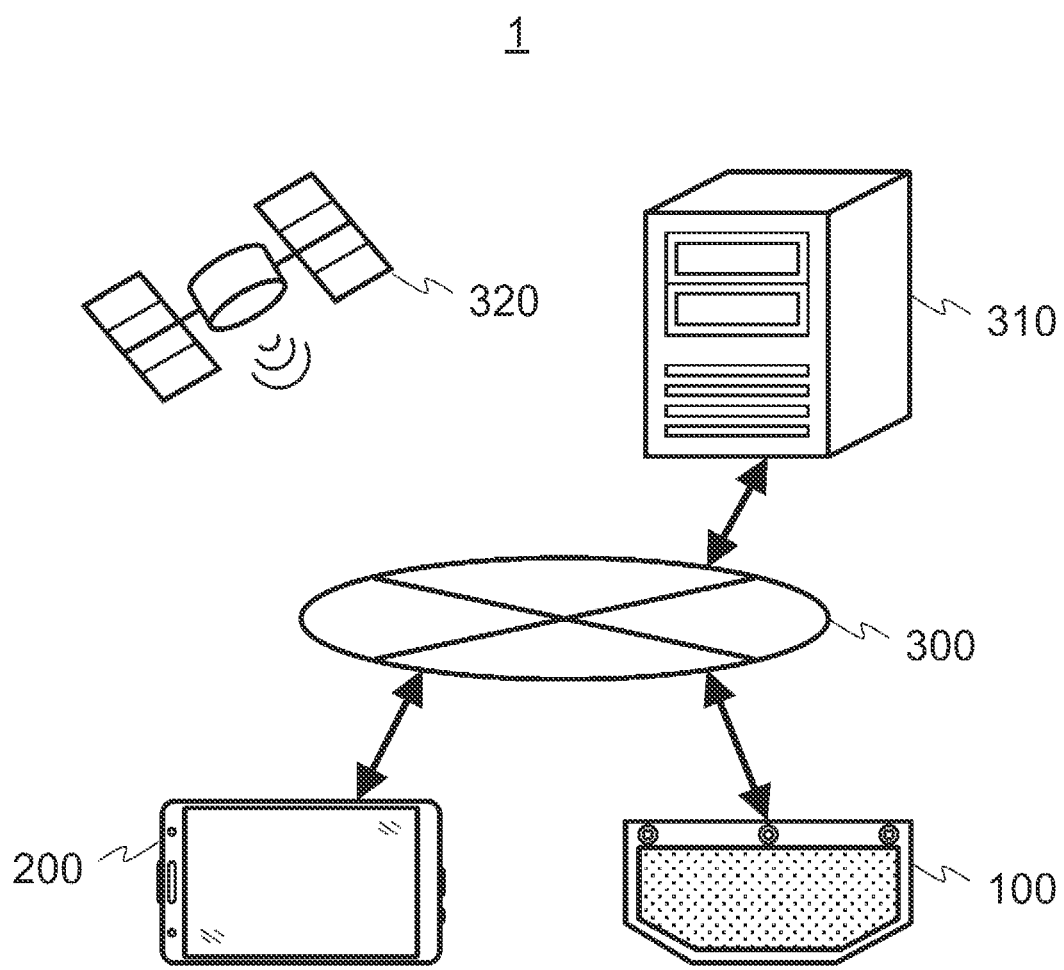
FIG. 1 is a system configuration diagram of an augmented reality processing system according to the present embodiment.

Hereinafter, embodiments of the present invention will be described with reference to the drawings. The same components are designated by the same reference numerals throughout all the drawings, and dual description will be omitted. In the following description, augmented reality may be described as AR (Augmented Reality).

First Embodiment

A first embodiment is an embodiment in which an information display device transfers AR object information to an information processing device, and the information processing device performs processing of adding an added AR object consisting of a comment to an AR object in association therewith and thereafter returns added AR object information to the information display device to display the same thereon. In the first embodiment, an AR object arranged in a virtual space on the basis of a world coordinate system on the basis of a real space is targeted for editing.

<System Configuration Diagram>

FIG. 1 is a system configuration diagram of an augmented reality processing system 1 according to the present embodiment.

The augmented reality processing system 1 is configured by connecting each of an HMD (Head Mounted Display) 100 as an information display device, a tablet terminal 200 as an information processing device, and an AR object server 310 to a communication network 300.

The HMD 100 and the tablet terminal 200 share a world coordinate system on the basis of a real space. In the present embodiment, a GPS coordinate system is used as the world coordinate system. Thus, the HMD 100 and the tablet terminal 200 acquire GPS signals as position information signals from a position information transmitting device 320. However, the world coordinate system is not limited to the GPS coordinate system, and may be a coordinate system common to the HMD 100 and the tablet terminal 200 based on the real space. The position information transmitting device 320 may be used as a beacon transmitting device transmitting a Bluetooth (registered trademark) beacon signal to share the beacon signal to thereby implement a common coordinate system.

Figure 2:
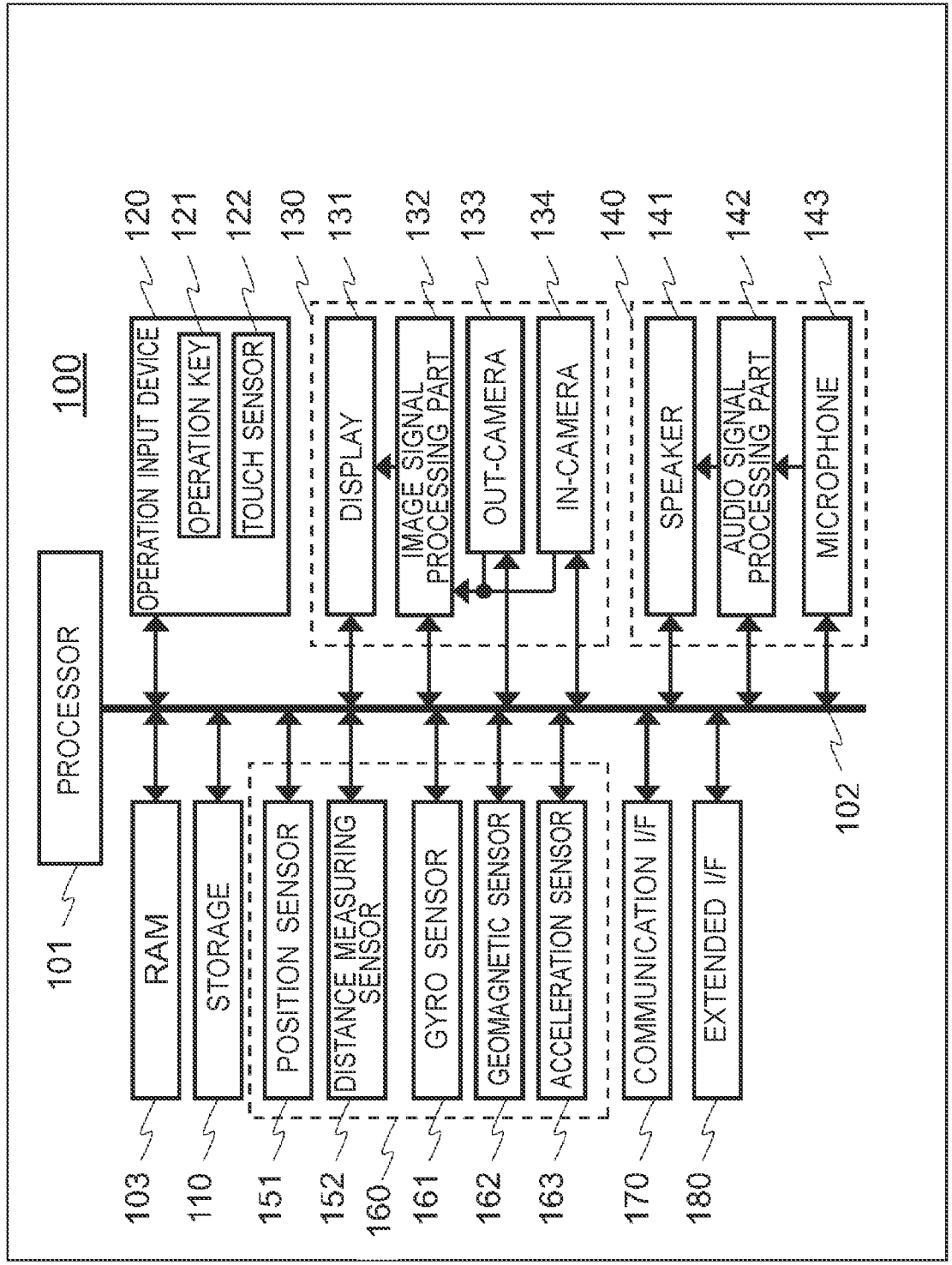
FIG. 2 is a hardware configuration diagram of an HMD.

FIG. 2 is a hardware configuration diagram of the HMD 100.

The HMD 100 includes: a processor 101 (corresponding to a first processor) using a CPU an MCU, or the like; a RAM 103; a storage 110; an operation input device (user operation interface) 120; an image processing unit 130; an audio processing unit 140; a sensor group 160; a communication I/F 170 (corresponding to a first communication device); and an extended I/F 180. These are connected to each other by a bus 102.

The storage 110 is configured using a non-volatile storage medium such as a Flash ROM, an EEPROM, an SSD, an HDD, or the like.

The operation input device 120 includes an operation key 121 and a touch sensor 122.

The operation key 121 includes, for example, SWs, a power key, a volume key, and the like.

The touch sensor 122 is comprised of, for example, a touch pad and is used for operations of the HMD 100 and the like.

The image processing unit 130 is configured to include a display 131 (corresponding to a first display), an image signal processing part 132, an out-camera 133 (for forward shooting), and an in-camera 134 (for line-of-sight detection).

The display 131 may be a transmissive type display or a non-transmissive type display.

The image signal processing part 132 is configured using, for example, an image (video) signal processor.

The audio processing unit 140 is configured to include a speaker 141, an audio signal processing part 142, and a microphone 143.

The audio signal processing part 142 is configured using, for example, an audio signal processor.

The sensor group 160 includes a position sensor 151, a distance measuring sensor 152, a gyro sensor 161, a geomagnetic sensor 162, and an acceleration sensor 163.

The position sensor 151 is, for example, a GPS sensor.

The distance measuring sensor 152 may be a distance sensor or a depth sensor. Further, the out-camera 133 is formed as a stereo camera including a left out-camera 133L (refer to FIG. 3A) and a right out-camera 133R (refer to FIG. 3A), and may capture an image having parallax and measure the distance to an object on the basis of the image. In this case, since the stereo camera corresponds to the distance measuring sensor 152, the out-camera 133 and the distance measuring sensor 152 can be configured by one image input device.

The communication I/F 170 corresponds to, for example, a LAN communication I/F, a telephone network (Mobile) communication I/F, and a Bluetooth® communication I/F.

The extended I/F 180 is, for example, a USB device connection terminal and is used for data transmission and reception, charging, and the like.

The bus 102 forms a transmission and reception path for commands and data.

Figure 3A:
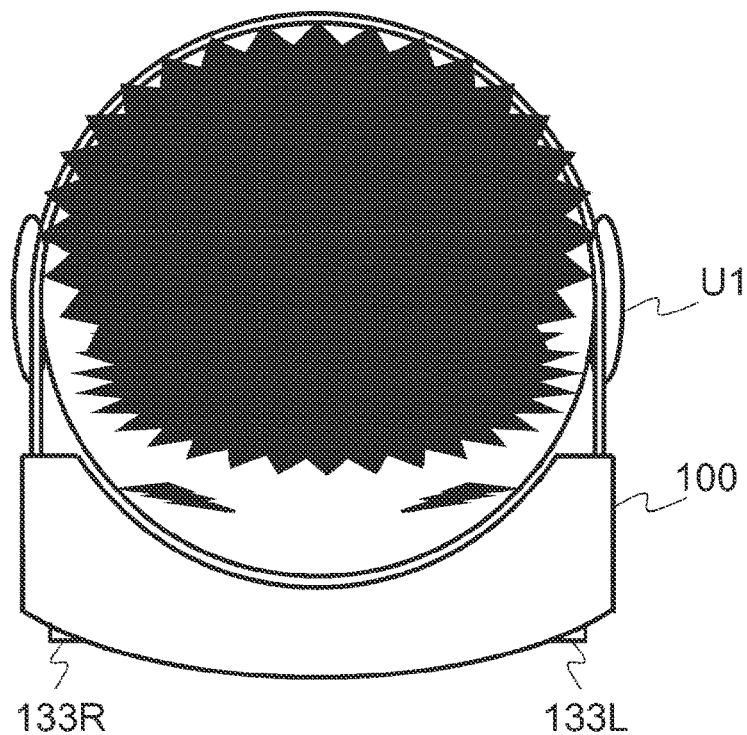
FIG. 3A is a top view of the HMD.
Figure 3B:
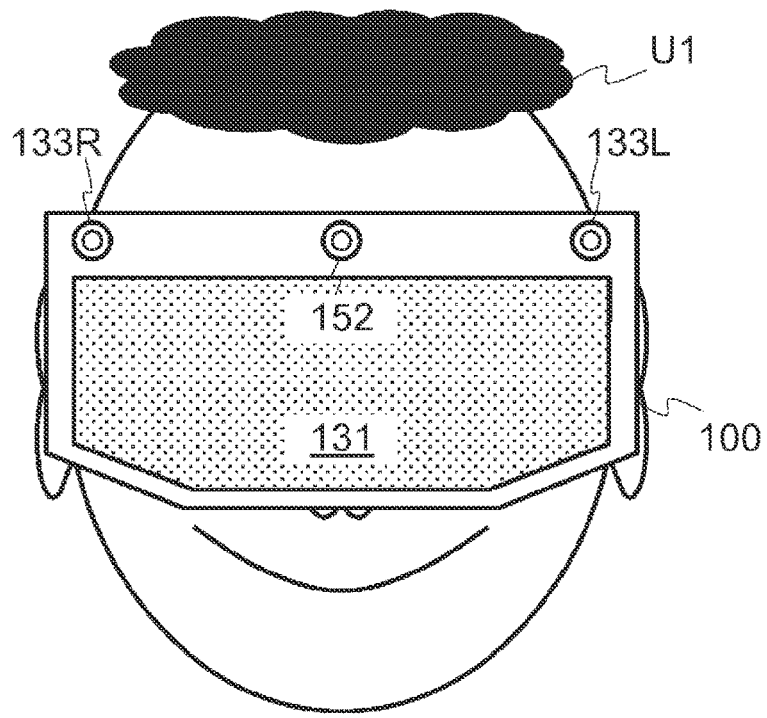
FIG. 3B is a front view of the HMD.
Figure 3C:
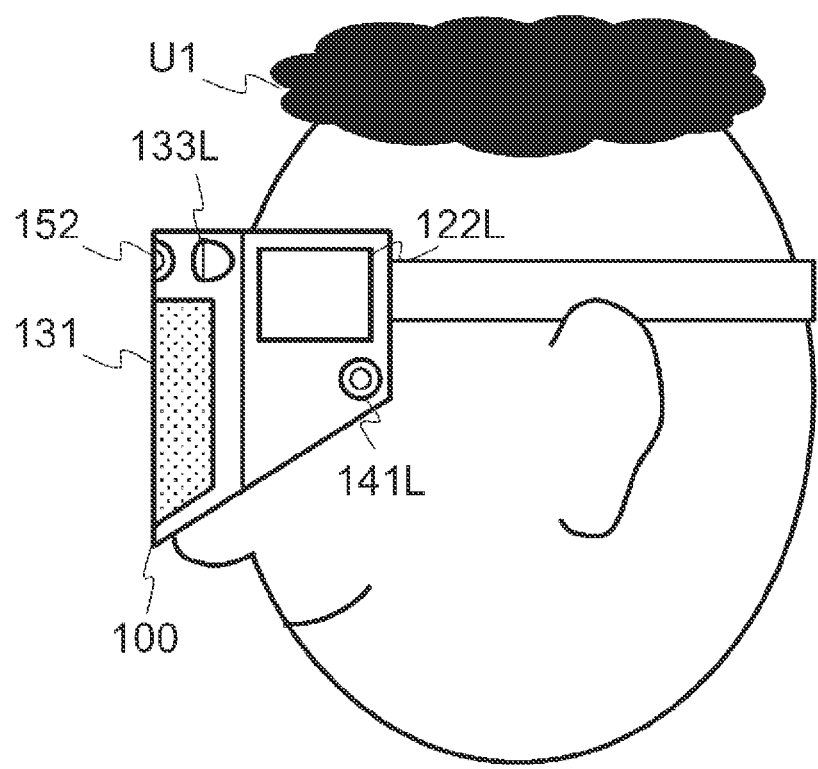
FIG. 3C is a left side view of the HMD.

FIG. 3A is a top view of the HMD 100, FIG. 3B is a front view of the HMD 100, and FIG. 3C is a left side view of the HMD 100.

FIGS. 3A, 3B, and 3C show a state in which a user U1 wears the HMD 100. The HMD 100 includes, on its front surface, a display 131, a left out-camera 133L, a right out-camera 133R, and a distance measuring sensor 152. Further, the HMD 100 includes a touch sensor 122 and a left stereo speaker 141L on the left side surface. The out-camera 133 is not limited to the stereo camera, but may be one camera. Further, although the right-side surface is not illustrated in FIG. 3, on the right-side surface of the HMD 100, a right stereo speaker, a monaural microphone, and a charging terminal which is one of the extended I/Fs 180 are provided.

A right touch sensor may be provided on the right-side surface of the HMD 100 instead of a left touch sensor 122L. The touch sensor may be installed on either the left or right side, or may be provided on both sides.

The display 131 may be a transmissive type (optical transmissive type) in which the outside world can be directly visually recognized through the display 131, or may be a non-transmissive type (video transmissive type) in which the outside world can be visually recognized by displaying a video input by the out-camera 133 on the display 131 arranged on the back surface side of the housing. Further, a semi-transmissive type display may be used.

Figure 4:
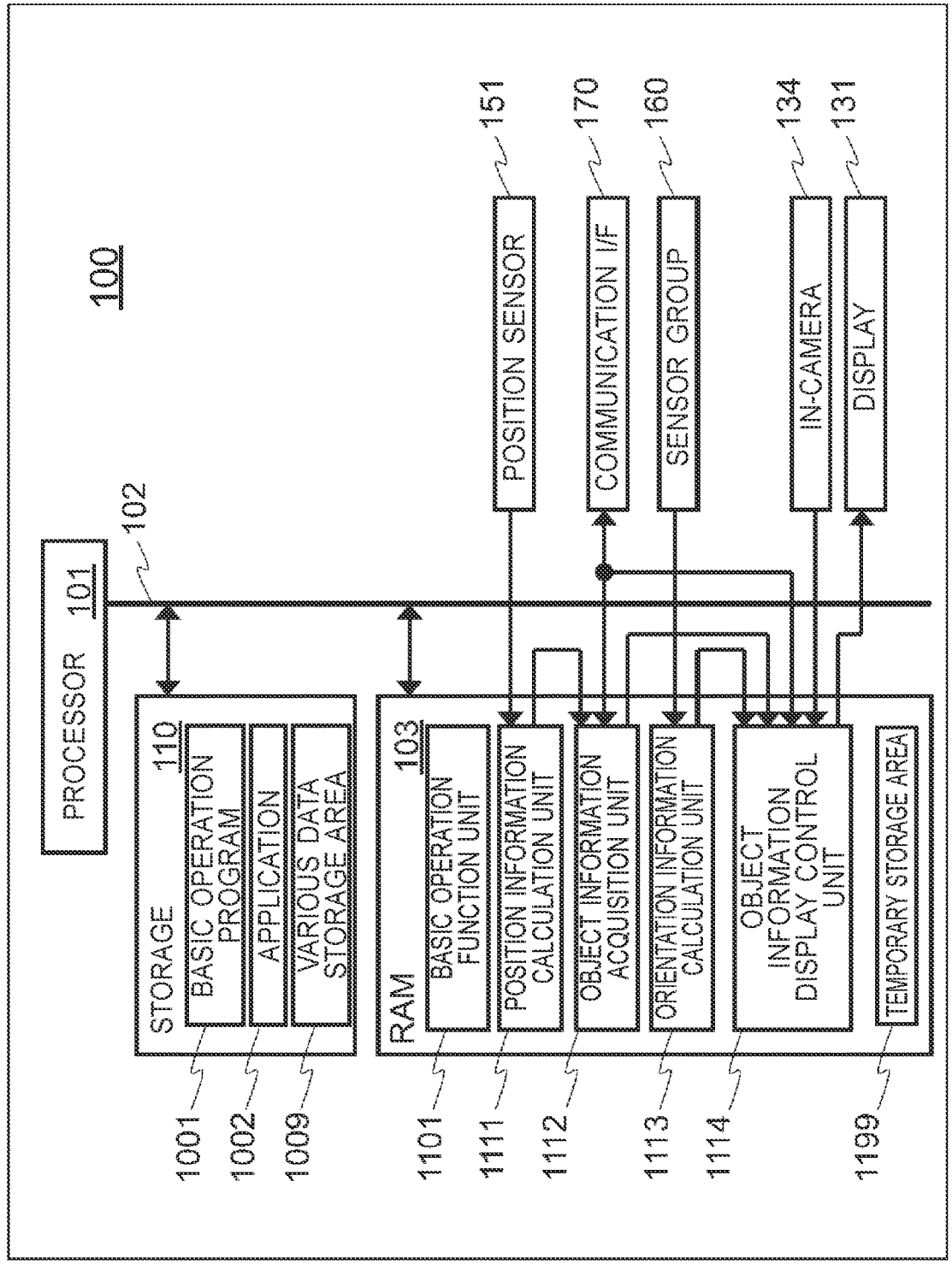
FIG. 4 is a functional block diagram of the HMD.

FIG. 4 is a functional block diagram of the HMD 100.

The storage 110 of the HMD 100 includes a basic operation program 1001 including a basic program such as an OS, an application program 1002 for realizing the functions of the augmented reality processing system 1 according to the present embodiment, and a various data storage area 1009 which serves as an area for storing various operation setting values and various information (for example video data, image data, audio data, etc.).

These basic operation program 1001 and application program 1002 stored in the storage 110 are expanded (loaded) in the RAM 103, and the processor 101 execute the expanded basic operation program 1001 and application program 1002 to thereby realize their functions.

The RAM 103 includes a basic operation function unit 1101 which controls the basic operation of the HMD 100, a position information calculation unit 1111 which calculates the position (coordinates) of the HMD 100 in the real world on the basis of a sensor output from the position sensor 151 to generate position information, an object information acquisition unit 1112 which acquires AR object information related to the position (coordinates) of the HMD 100 in the real world, an orientation information calculation unit 1113 which calculates the orientation related to the direction that the HMD 100 points in the real world, on the basis of a sensor output from the sensor group 160 such as the gyro sensor 161 and the geomagnetic sensor 162 to generate orientation information, an object information display control unit 1114 which performs display control of an AR object configured on the basis of the AR object information and transmission control of the AR object information to the linked tablet terminal 200, and a temporary storage area 1199 which temporarily stores various information created or acquired by each of the above-described function units.

Figure 5:
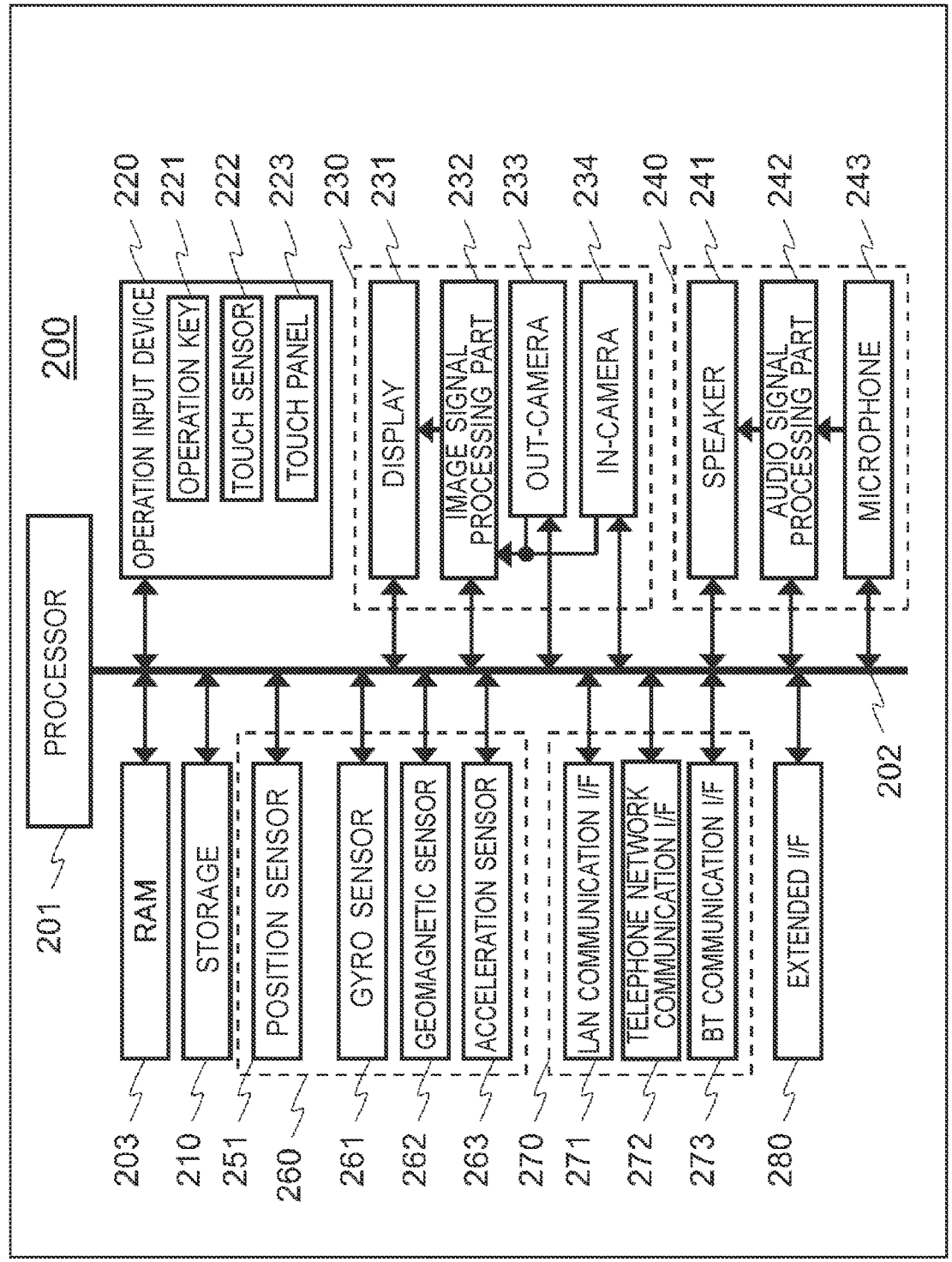
FIG. 5 is a hardware configuration diagram of a tablet terminal.

FIG. 5 is a hardware configuration diagram of the tablet terminal 200. Dual description of components having the same names as the HMD 100 will be omitted.

The tablet terminal 200 includes a processor 201 (corresponding to a second processor), a RAM 203, a storage 210, an operation input device 220, an image processing unit 230, an audio processing unit 240, a sensor group 260, a communication I/F 270 (corresponding to a second communication device), and an extended I/F 280. These are connected to each other by a bus 202.

The operation input device 220 includes a touch panel 223 in addition to an operation key 221 and a touch sensor 222. The touch sensor 222 is, for example, a fingerprint sensor or the like. The touch panel 223 is arranged so as to be superimposed on a display 231 (corresponding to a second display) and accepts an input operation for the tablet terminal 200.

The image processing unit 230 includes the display 231, an image signal processing part 232, an out-camera 233 for normal shooting, and an in-camera 234 used for self-shooting and line-of-sight detection.

The audio processing unit 240 includes a speaker 241, an audio signal processing part 242, and a microphone 243.

The sensor group 260 includes a position sensor 251, a gyro sensor 261, a geomagnetic sensor 262, and an acceleration sensor 263. In addition, the sensor group 260 may include a proximity sensor, an illuminance sensor, and a distance measuring sensor.

The communication I/F 270 includes a LAN communication I/F 271, a telephone network (Mobile) communication I/F 272, and a Bluetooth® communication I/F 273. In addition thereto, there may be an infrared communication I/F.

The extended I/F 280 is, for example, a USB device connection terminal and is used for data transmission and reception, charging, USB device connection, AV device connection, and the like.

FIG. 6A is a front view of the tablet terminal 200, and FIG. 6B is a back view of the tablet terminal 200.

As shown in FIG. 6A, the tablet terminal 200 is provided with a power supply SW221P (corresponding to an operation key) on the upper surface thereof. Further, the tablet terminal 200 is provided with a monaural microphone 243M and a USB terminal 280U (corresponding to the extended I/F 280) on the bottom surface thereof.

Further, the tablet terminal 200 is provided, on the front surface, with a touch screen 290, an LED 224, an in-camera 234, and a monaural speaker 241M (corresponding to the speaker 241) used at phone call.

The LED 224 is for notifying an operating state and notifies the operating state in a lighting by blinking.

The touch screen 290 is configured by stacking the touch panel 223 on the display 231.

Further, as shown in FIG. 6B, a touch sensor 222 comprised of a fingerprint sensor used for personal authentication, an out-camera 233, a strobe 235 which emits auxiliary light, and a stereo speaker 241S used during AV playback are provided on the back surface of the tablet terminal 200.

Figure 7:
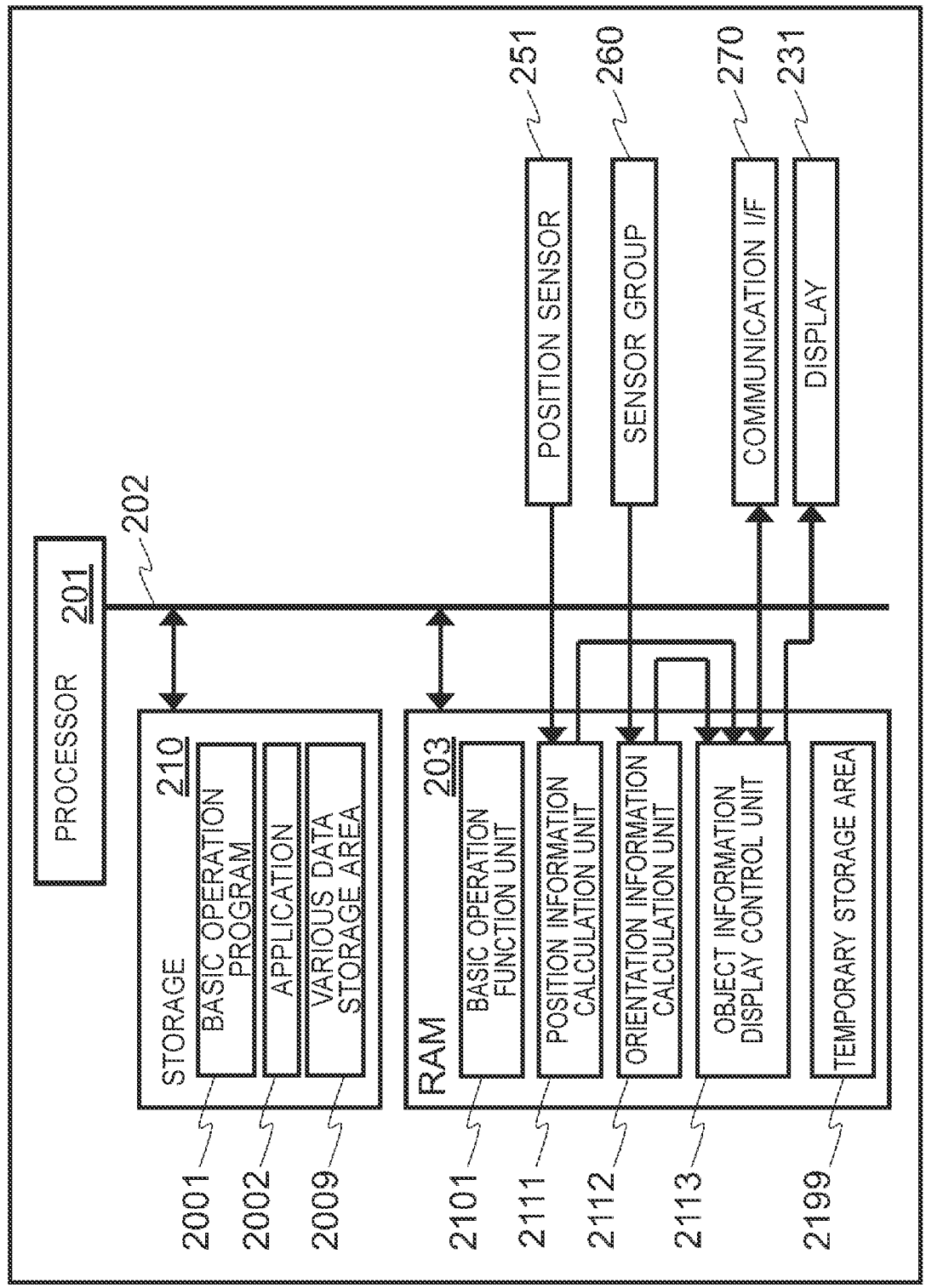
FIG. 7 is a functional block diagram of the tablet terminal.

FIG. 7 is a functional block diagram of the tablet terminal 200.

The storage 210 includes a basic operation program 2001, an application program 2002 (an application which executes the functions of the augmented reality processing system 1 according to the present embodiment and other applications), and a various data storage area 2009. The various data storage area 2009 is an area for storing various operation setting values and various information, for example, video data, image data, and audio data, etc.

The basic operation program 2001 and the application program 2002 stored in the storage 210 are expanded (loaded) in the RAM 203, and the processor 201 executes the expanded basic operation program 2001 and application program 2002 to thereby realize the functions thereof.

The RAM 203 includes a basic operation function unit 2101, a position information calculation unit 2111, an orientation information calculation unit 2112, an object information display control unit 2113, and a temporary storage area 2199.

The basic operation function unit 2101 controls the basic operation of the tablet terminal 200.

The position information calculation unit 2111 calculates the position (coordinates) of the tablet terminal 200 in the real world and outputs its position information.

The orientation information calculation unit 2112 calculates the orientation related to the direction in which the tablet terminal 200 points in the real world, and outputs its orientation information.

The object information display control unit 2113 controls transmission and reception of AR object information from the linked HMD 100, display of a provisional AR object configured on the basis of the AR object information, and the like.

The temporary storage area 2199 is a temporary storage area for various information created or acquired by each of the above-described function units.

<Outline of Processing of Augmented Reality Processing System 1>

The outline of processing of the augmented reality processing system 1 will be described with reference to FIGS. 8, 9 and 10.

Figure 8A:
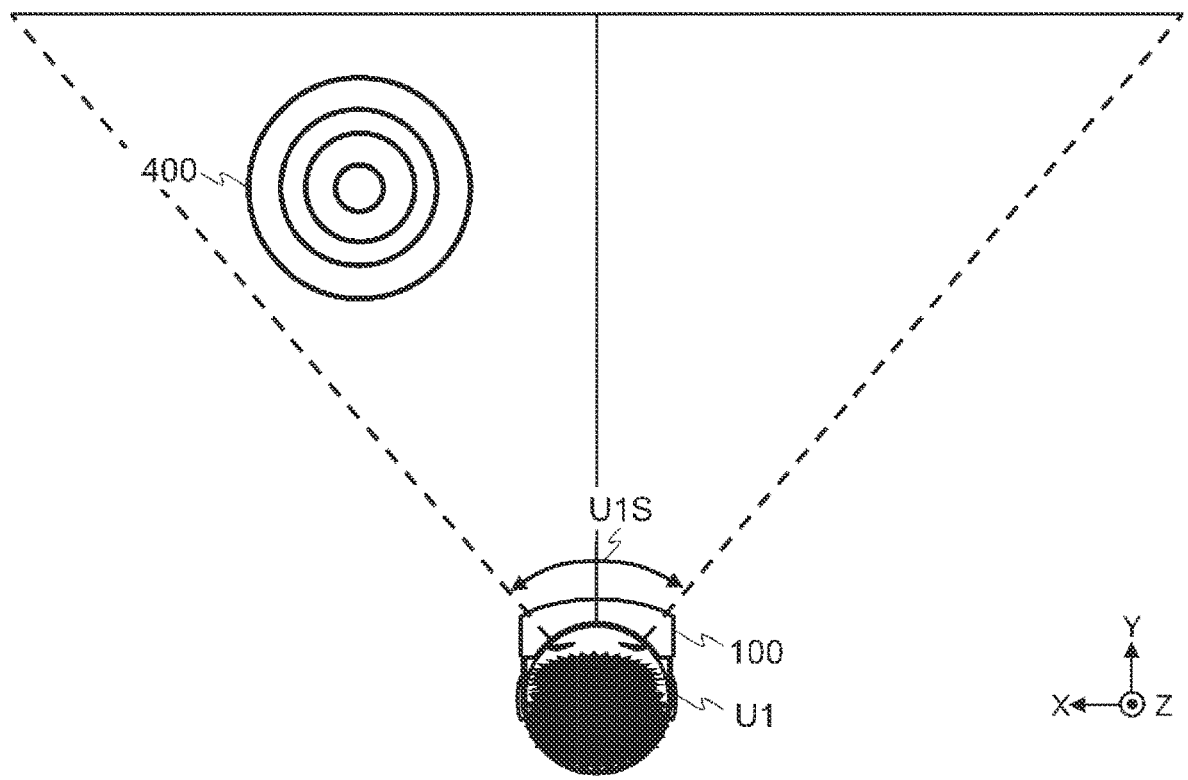
FIG. 8A is a bird's-eye view showing a state in which a user is viewing a real world with an AR object display function turned off.
Figure 8B:
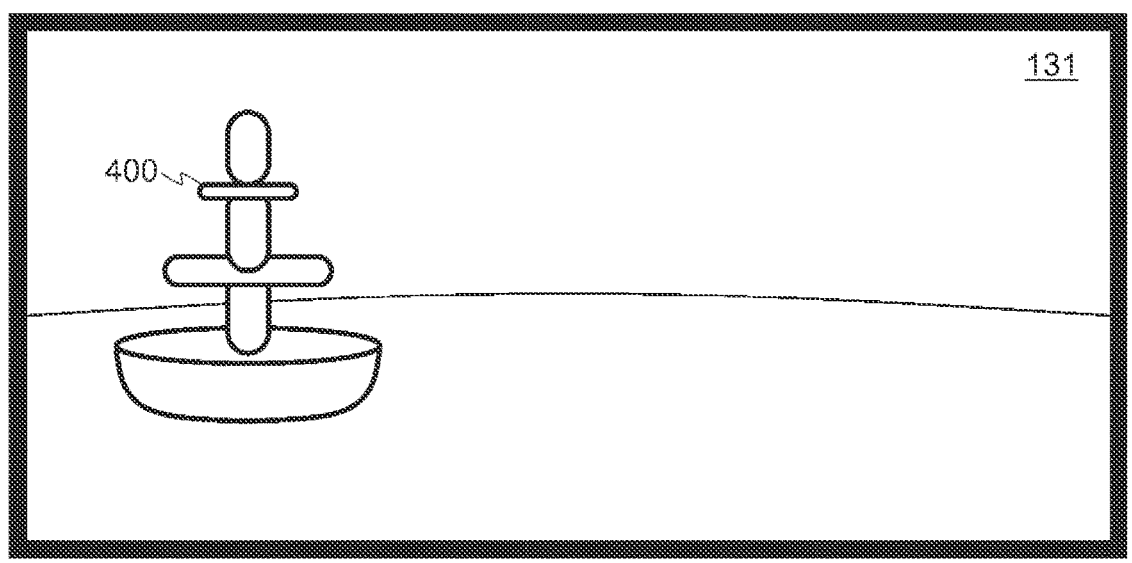
FIG. 8B is a diagram showing a user's field of view through a display of the HMD.

FIG. 8A is a bird's-eye view showing a state in which the user U1 is visually recognizing the real world with the AR object display function turned off. FIG. 8B is a diagram showing the field of view of the user U1 at that time. In FIGS. 8A and 8B, since the AR object display function of the HMD 100 is off, only a real object in the real world is visually recognized.

The field of view range U1S of the user U1 via the display 131 of the HMD 100 contains a reality object 400 comprised of an image (video) of a fountain being a real object. Therefore, the user U1 visually recognizes the reality object 400 of the fountain made of the real object in front of the HMD 100 through the display 131, or visually recognizes the reality object 400 of the fountain displayed on the display 131.

Figure 9A:
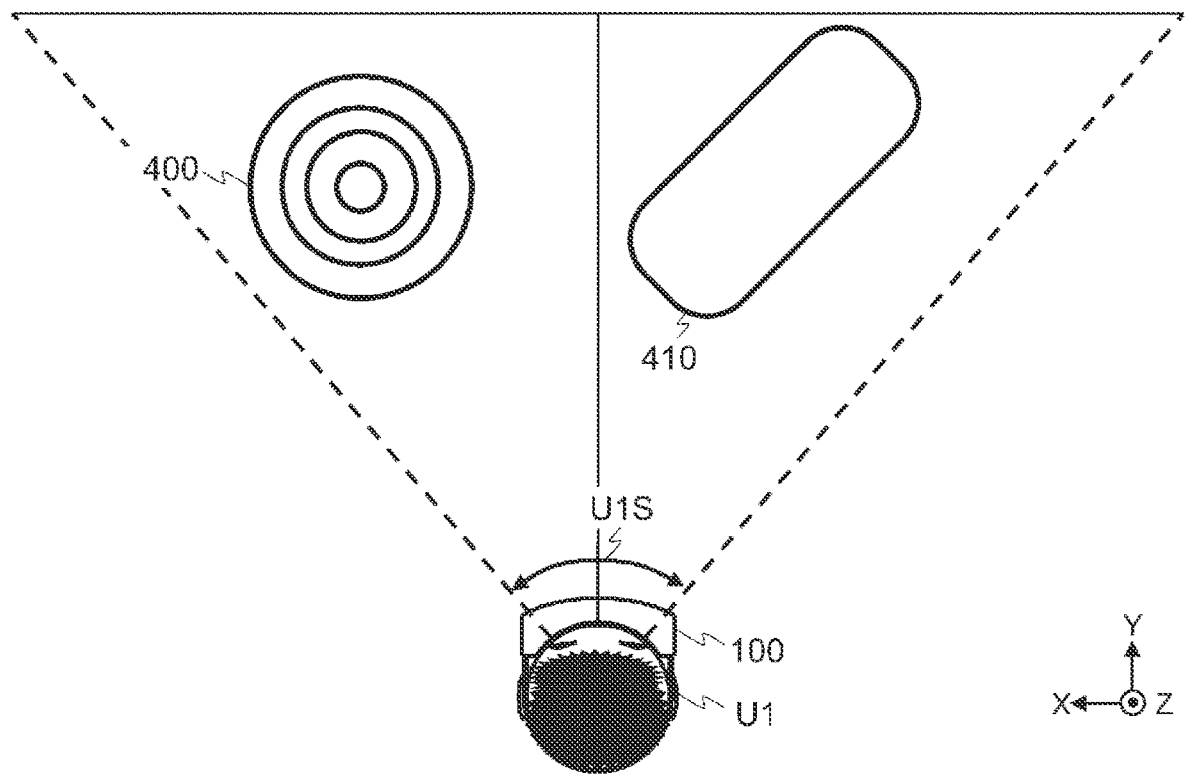
Figure 9B:
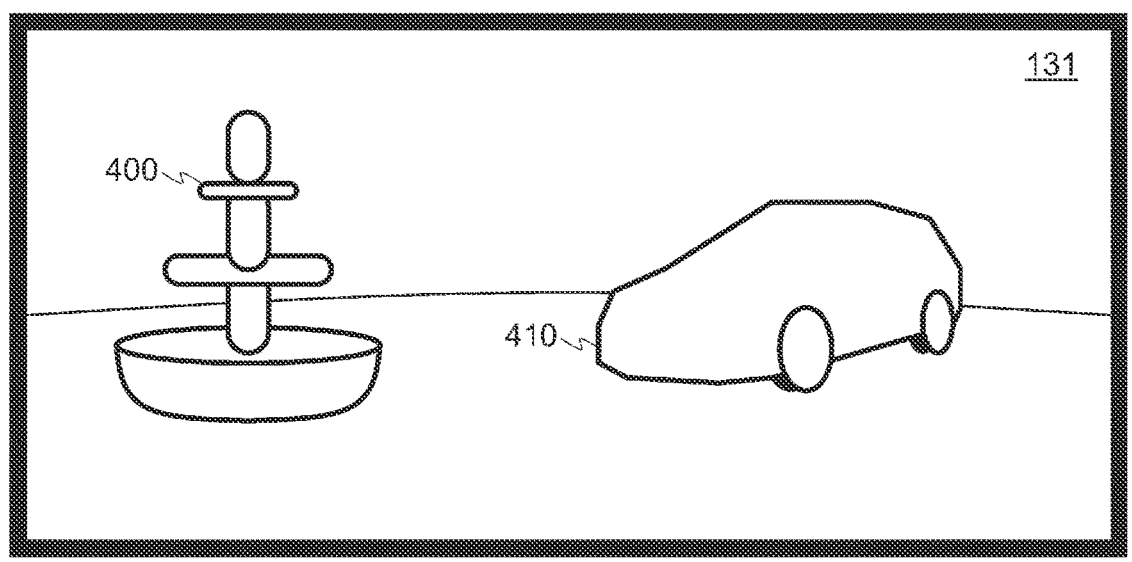
FIG. 9B is a diagram showing a user's field of view through the display of the HMD.

FIG. 9A is a bird's-eye view showing a state in which the user U1 is visually recognizing the real world with the AR object display function turned on. FIG. 9B is a diagram showing the field of view of the user U1 through the display of the HMD at that time. In FIGS. 9A and 9B, since the AR object display function of the HMD 100 is turned on, the user U1 is visually recognizing both the real object in the real world and the AR object arranged in the world coordinate system virtual space.

The field of view range U1S of the user U1 via the display 131 of the HMD 100 contains an AR object 410 of a vehicle in addition to the reality object 400 of the fountain. Therefore, the user U1 visually recognizes the reality object 400 of the fountain in front through the display 131 of the HMD 100, and also visually recognizes the AR object 410 of the vehicle displayed on the display 131. Alternatively, the user U1 visually recognizes the reality object 400 of the fountain displayed on the display 131 and the AR object 410 of the vehicle at the same time.

The AR object 410 is arranged in the world coordinate system virtual space. The world coordinate system virtual space is a virtual space which shares position information with the real world. The real world and the world coordinate system virtual space may be collectively referred to as a world coordinate system space.

Figure 10:
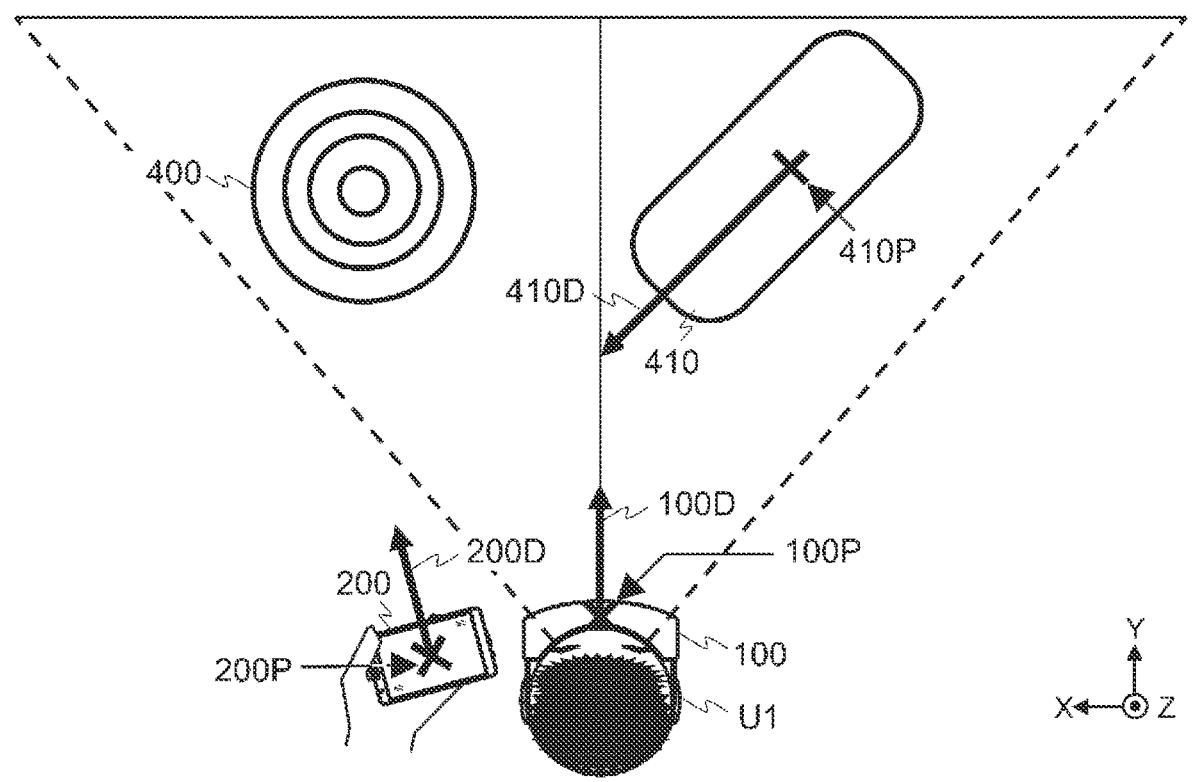
FIG. 10 is a bird's-eye view showing position (coordinate) information and orientation information of the HMD, tablet terminal, and AR object in a world coordinate system space.

FIG. 10 is a bird's-eye view showing position (coordinate) information and orientation information of the HMD 100, the tablet terminal 200, and the AR object 410 in the world coordinate system space.

In the following description, the position (coordinate) information in the world coordinate system space is represented by (X, Y). In "X", the longitude in the real world is as an axis, and in "Y", the latitude in the real world is as an axis. Incidentally, regarding a Z direction (height direction), the illustration and description will be omitted hereafter for simplification of description.

Also, the orientation information in the world coordinate system space is represented by D. The orientation information indicates which direction to point on the basis of a coordinate position specified by the position information in the world coordinate system space. For simplification of description, only a two-dimensional orientation direction in an XY plane in the world coordinate system space is shown.

In FIG. 10, the position information and orientation information of the HMD 100 are that position (coordinate) information of a reference position 100P of the HMD 100 in the world coordinate system space, which is detected by the position sensor 151 is represented by (X (hmd), Y (hmd)), and orientation information 100D in the direction directed by the HMD 100, which is acquired by the sensor group 160 is represented by D (hmd). The "direction in which the HMD 100 points" is synonymous with the normal direction to the central position of the display 131 of the HMD 100.

The position information and orientation information of the tablet terminal 200 are that position (coordinate) information of a reference position 200P of the tablet terminal 200 in the world coordinate system space, which is detected by the position sensor 251 is represented by (X (tab), Y (tab)), and orientation information 200D in the direction directed by the tablet terminal 200, which is acquired by the sensor group 260 is represented by D (tab). The "direction in which the tablet terminal 200 points" is synonymous with the normal direction to the central position of the back surface part of the housing of the tablet terminal 200.

In the AR object 410, in advance, (X (obj), Y (obj)) is set as position (coordinate) information of a reference position 410P, and D (obj) is set as orientation information 410D. When the position (coordinate) information (X (obj), Y (obj)) of the reference position 410P falls within the field of view range of the user U1 via the display 131 of the HMD 100, the AR object 410 is displayed at the position on the display 131 corresponding to the position (coordinate) information (X (obj), Y (obj)) and in the direction corresponding to the orientation information D (obj).

Figure 11:
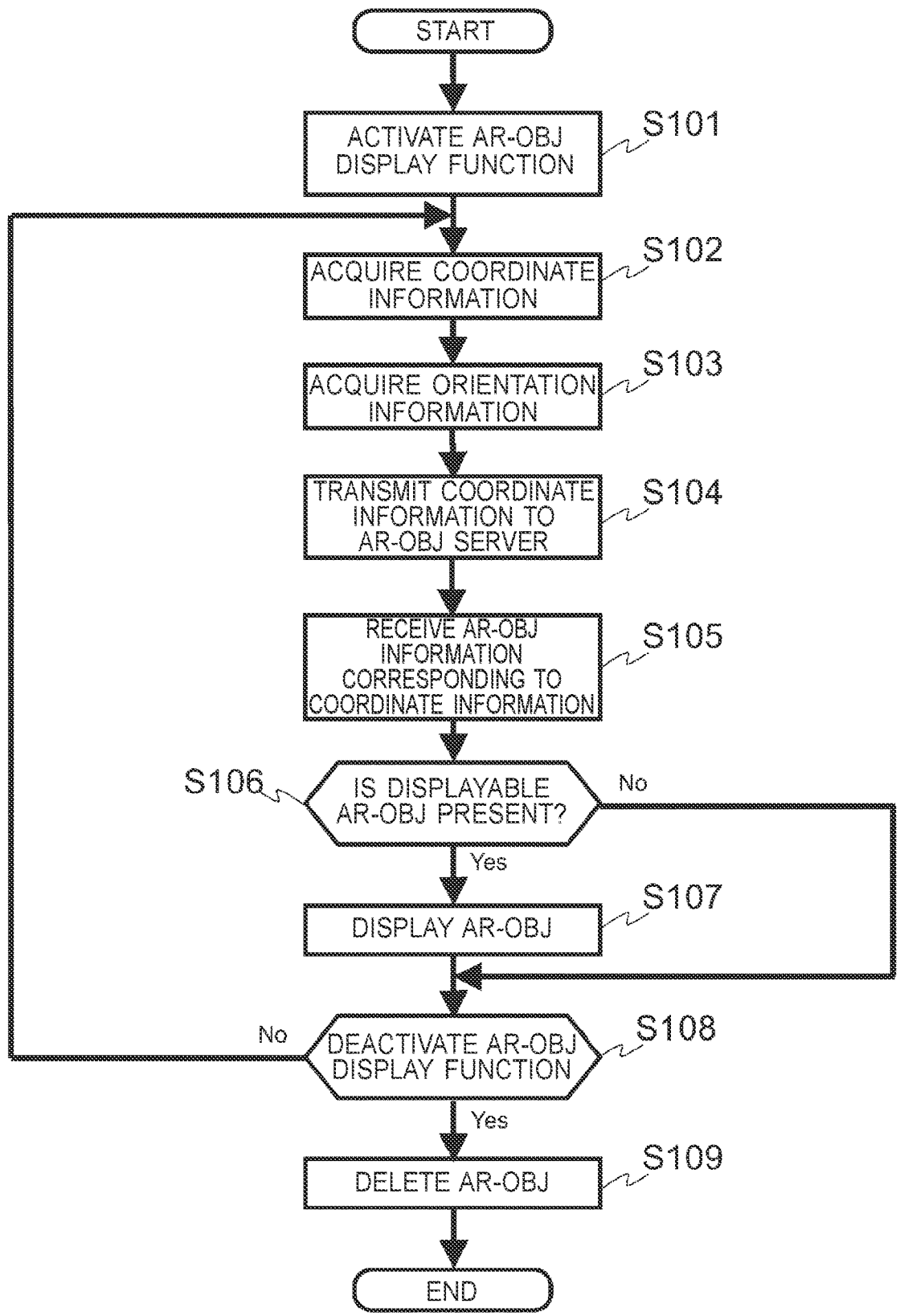
FIG. 11 is a flowchart showing the flow of AR object display processing in the HMD.

FIG. 11 is a flowchart showing the flow of AR object display processing in the HMD 100.

The basic operation function unit 1101 activates the AR object display function in response to the input operation of an AR object display function activation instruction from the user U1, which is received by the operation input device 120 (S101). When the basic operation function unit 1101 does not accept the input operation of the AR object display function activation instruction, subsequent processing is not performed.

The position information calculation unit 1111 calculates the position (coordinate) information (X (hmd), Y (hmd)) of the HMD 100 in the real world, on the basis of the position information signal acquired from the position information transmitting device 320 through the position sensor 151 (S102).

The orientation information calculation unit 1113 calculates the orientation information (D (hmd)) regarding the direction in which the HMD 100 points in the real world, on the basis of various information (geomagnetic information, etc.) acquired by the sensor group 160 (S103).

The object information acquisition unit 1112 transmits the position (coordinate) information of the HMD 100 in the real world, which is calculated in S102 to the AR object server 310 (described as an "AR-OBJ server" in FIG. 11) through the communication I/F 170 (S104).

The object information acquisition unit 1112 acquires the AR object information transmitted from the AR object server 310 via the communication I/F 170 in response to the position (coordinate) information transmitted in the processing of S104 (S105). Incidentally, the AR object server 310 transmits to the HMD 100, only the AR object information related to the AR object whose relative distance to the position (coordinates) information transmitted in the processing of S104 becomes a predetermined value (for example, 10 m) or less.

Among the AR objects each configured on the basis of the AR object information acquired in the processing of S105, the object information display control unit 1114 determines whether or not there is an AR object displayable in the field of view range U1S of the user U1 wearing the HMD 100, which is set on the basis of the position (coordinate) information (X (hmd), Y (hmd)) of the HMD 100 calculated in the processing of S102 and the orientation information D (hmd) of the HMD 100 calculated in the processing of S103 (S106).

When the object information display control unit 1114 determines that the displayable AR object is present (S106: Yes), the object information display control unit 1114 displays the AR object on the display 131 (S107: state of FIG. 9B). The AR object 410 displayed on the display 131 may be enlarged or reduced according to the relative distance between the reference position 100P of the HMD 100 and the reference position 410P of the AR object 410.

When the object information display control unit 1114 determines that there is no displayable AR object (S106: No), the processing proceeds to S108.

When the basic operation function unit 1101 determines that the operation input device 120 has acquired an operation instruction (AR object display function deactivation instruction) of the user U1 (S108: Yes), the object information display control unit 1114 deletes the AR object displayed on the display 131 (S109), and the basic operation function unit 1101 deactivates the AR object display function. The scenery visually recognized by the user U1 via the display 131 changes from FIG. 9B to FIG. 8B.

When the basic operation function unit 1101 determines that the operation input device 120 has not acquired the operation instruction (AR object display function deactivation instruction) of the user U1 (S108: No), the processing returns to S102.

<AR Object Fixing Processing (HMD 100)>

Figure 12:
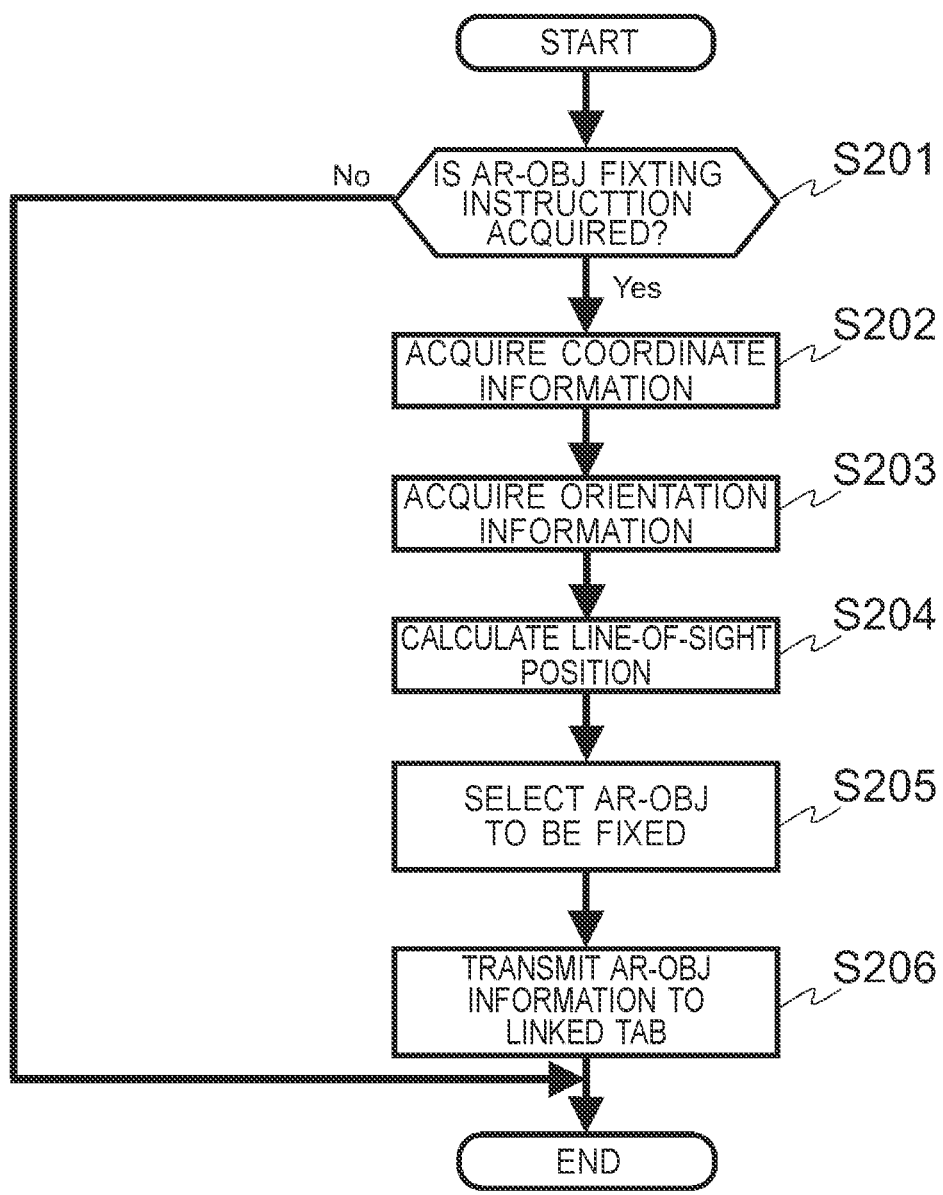
FIG. 12 is a flowchart showing the flow of AR object fixing processing in the HMD.
Figure 13A:
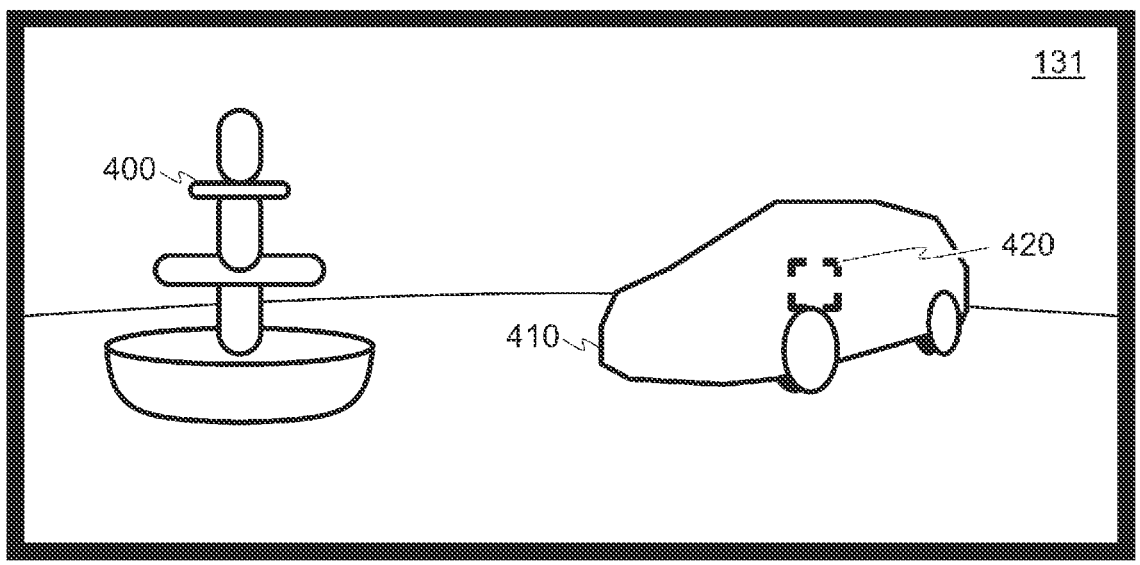
FIG. 13A is a diagram showing a user's field of view when performing an AR object fixing instruction.

The AR object fixing processing in the HMD 100 will be described with reference to FIGS. 12 and 13A. FIG. 12 is a flowchart showing the flow of the AR object fixing processing in the HMD 100. FIG. 13A is a diagram showing the field of view of the user U1 when performing an AR object fixing instruction.

As shown in FIG. 12, when the basic operation function unit 1101 of the HMD 100 determines to have acquired the operation instruction (AR object fixing instruction) (S201: Yes), the processing proceeds to S202. When it is determined that the basic operation function unit 1101 does not acquire the operation instruction (AR object fixing instruction) (S201: No), the processing ends without performing the AR object fixing processing.

As the input operation of the AR object fixing instruction, for example, the following operations may be performed.
1) The touch sensor 122 accepts a touch operation of the user U1.
2) The microphone 143 receives an audio instruction issued from the user U1.
3) A command transmitted from the linked tablet terminal 200 is accepted via the communication I/F 170.

Based on the position information signal acquired from the position information transmitting device 320 through the position sensor 151, the position information calculation unit 1111 calculates the position (coordinate) information (X (hmd0), Y (hmd0)) of the HMD 100 in the real world at the time of executing the AR object fixing processing (S202).

Based on various information (geomagnetic information, etc.) acquired by the sensor group 160, the orientation information calculation unit 1113 calculates orientation information (D (hmd0)) regarding the direction in which the HMD 100 at the time of executing the AR object fixing processing is oriented in the real world (S203).

The object information display control unit 1114 calculates to which position on the display 131 the line-of-sight of the user U1 at the time of executing the AR object fixing processing corresponds, on the basis of an eye image of the user U1 acquired by the in-camera 134 (S204). A line-of-sight position mark 420 (refer to FIG. 13A) indicates the line-of-sight position of the user U1 calculated in the processing of S204 and is displayed on the display 131. Incidentally, the line-of-sight position mark 420 may not be displayed on the display 131.

The object information display control unit 1114 selects from the AR objects displayed on the display 131, the AR object 410 which overlaps with the line-of-sight position of the user U1 calculated in S204 or is closest to the line-of-sight position (S205: state of FIG. 13A).

The object information display control unit 1114 transmits the AR object information related to the AR object 410 selected in the processing of S205 to the linked tablet terminal 200 via the communication I/F 170 in conjunction with the position (coordinate) information and orientation information of the HMD 100 calculated in the processing of S202 and S203 (S206). Instead of transmitting the AR object information, the object information display control unit 1114 may transmit information such as a URL for acquiring the AR object information. In this case, the linked tablet terminal 200 acquires the AR object information from the AR object server 310 on the basis of the information such as the URL. This concludes the AR object fixing processing in the HMD 100.

<AR Object Fixing Processing (Tablet Terminal 200)>

Figure 13B:
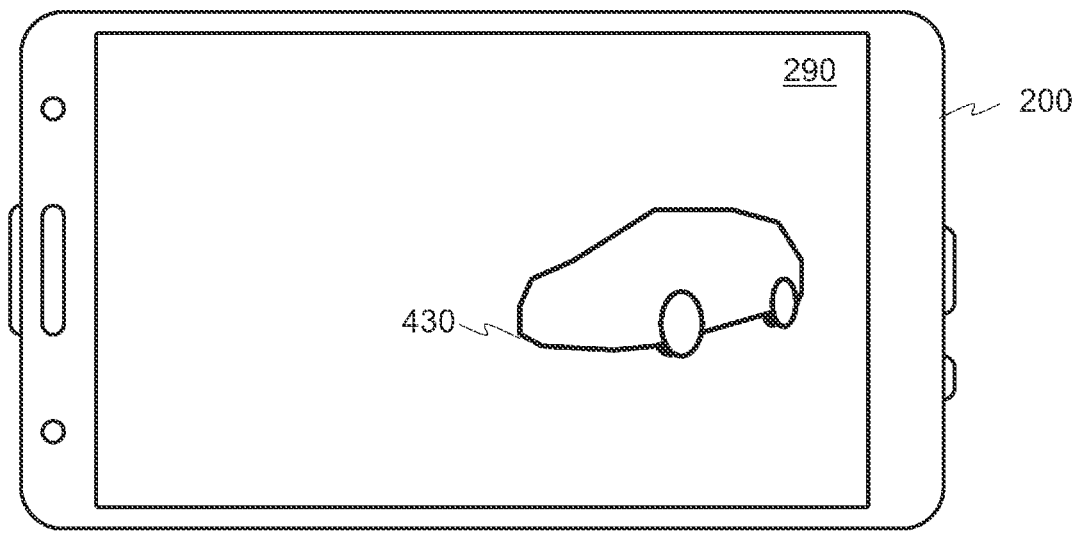
FIG. 13B is a diagram showing an image displayed on a touch screen of the tablet terminal by the AR object fixing processing.

The AR object fixing processing in the tablet terminal 200 will be described with reference to FIGS. 13B and 14. FIG. 13B is a diagram showing an image displayed on the touch screen 290 of the tablet terminal 200 by the AR object fixing processing, and FIG. 14 is a flowchart showing the flow of the AR object fixing processing in the tablet terminal 200.

Figure 14:
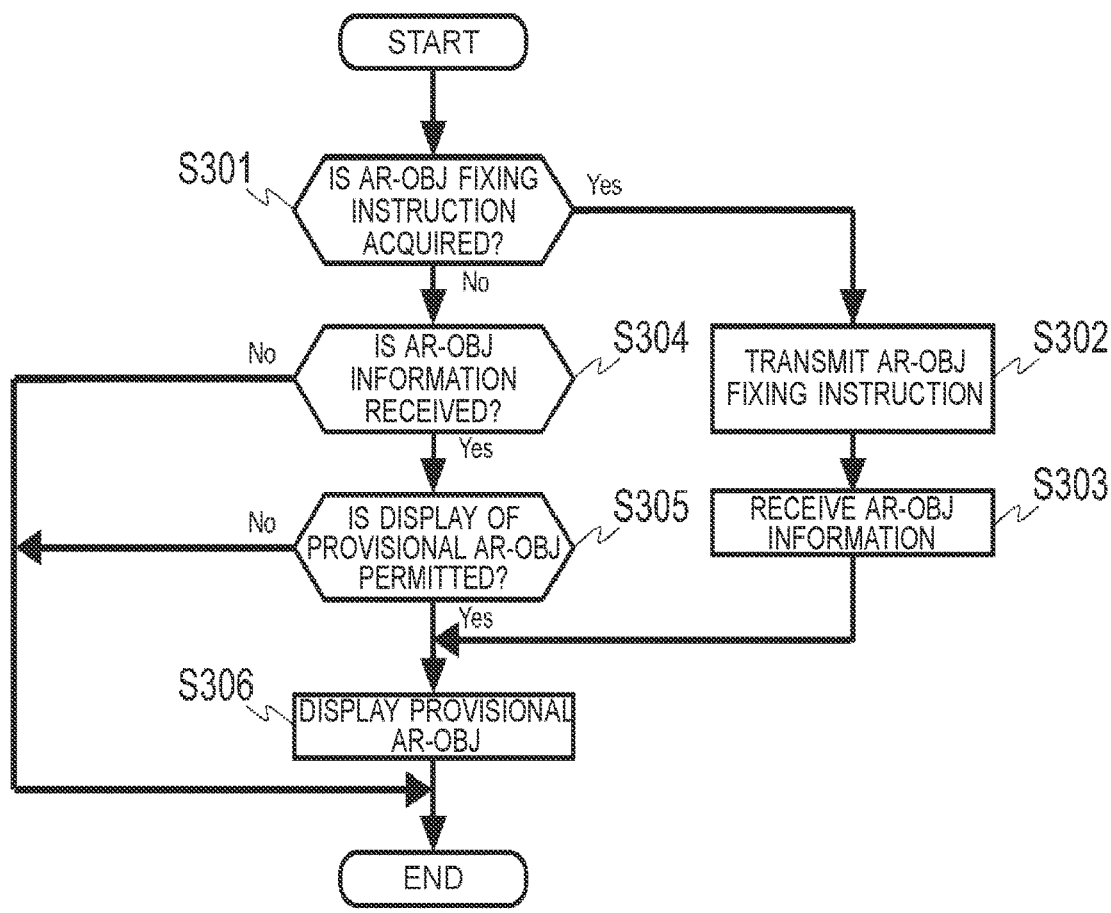
FIG. 14 is a flowchart showing the flow of AR object fixing processing in the tablet terminal.

As shown in FIG. 14, when the basic operation function unit 2101 of the tablet terminal 200 determines that the operation input device 220 has acquired the operation instruction (AR object fixing instruction) from the user U1 (S301: Yes), the processing proceeds to S302.

The object information display control unit 2113 transmits a command (AR object information transmission request) to the linked HMD 100 through the communication I/F 270 (S302).

The object information display control unit 2113 receives via the communication I/F 270 the AR object information or the like transmitted from the linked HMD 100 in response to the command transmitted in the processing of S302 (S303). Then, the processing proceeds to S306.

On the other hand, when the basic operation function unit 2101 of the tablet terminal 200 determines that the operation input device 220 has not acquired the operation instruction (AR object fixing instruction) from the user U1 (S301: No), and the object information display control unit 2113 determines to have received the AR object information or the like from the linked HMD 100 via the communication I/F 270 (S304: Yes), the processing proceeds to S305.

In S305, the object information display control unit 2113 confirms with the user U1 whether or not to display on the display 231 that the AR object information or the like has been received from the linked HMD 100, and display a provisional AR object configured on the basis of the received AR object information on the display 231 (S305). When the operation of permitting the display of the provisional AR object is received from the user U1 (S305: Yes), the processing proceeds to S306.

In S306, the object information display control unit 2113 displays a provisional AR object configured on the basis of the AR object information received from the linked HMD 100 on the display 231 (touch screen 290) (S306). FIG. 13B shows a state in which the provisional AR object 430 is displayed on the display 231 of the tablet terminal 200. The provisional AR object 430 is an AR object in which the AR object 410 of FIG. 13A is displayed in an editable state. Before editing, the provisional AR object 430 and the AR object 410 are similar AR objects.

When the AR object information is not received (S304: No), when the display of the provisional AR object is not permitted (S305: No), and after the execution of S306, the AR object fixing processing in the tablet terminal 200 is terminated.

In the AR object fixing processing of the tablet terminal 200, the processing of transitioning from S301, S302, S303 to S306 is processing when the AR object fixing instruction is given on the tablet terminal 200.

On the other hand, the processing of transitioning from S3012, S304, S305 to S306 is processing when the AR object fixing instruction is given on the HMD 100.

The AR object 410 displayed on the display 131 of the HMD 100 and the provisional AR object 430 displayed on the display 231 of the tablet terminal 200 after the AR object fixing processing are different AR objects configured on the basis of the same AR object information. The AR object 410 is continuously arranged in the world coordinate system virtual space, and the provisional AR object 430 is arranged only during work in the terminal coordinate system virtual space (work space) with the tablet terminal 200 as a position reference.

<Provisional AR Object Display Processing (Tablet Terminal 200)>

Figure 15:
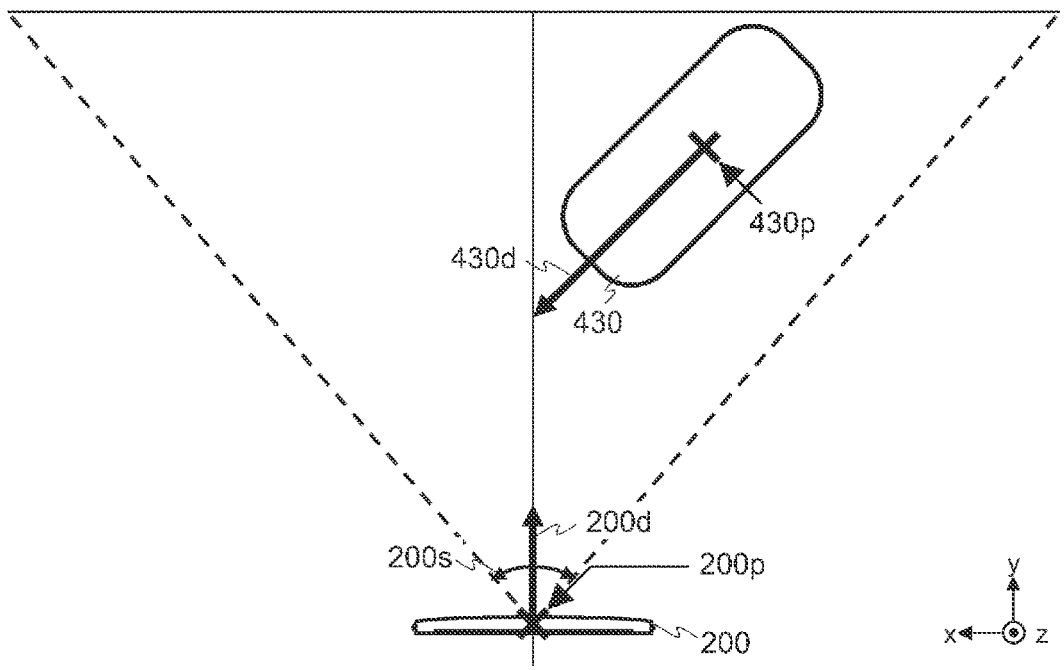
FIG. 15 is a bird's-eye view showing position (coordinate) information and orientation information in a terminal coordinate system virtual space (work space) with the tablet terminal as a position reference.

The provisional AR object display processing in the tablet terminal 200 will be described with reference to FIG. 15. FIG. 15 is a bird's-eye view showing position (coordinate) information and orientation information in a terminal coordinate system virtual space (work space) with the tablet terminal 200 as a position reference.

A display range 200s in the work space that the display 231 of the tablet terminal 200 can display is a range from an angle $-\theta$ to $\theta$ with a normal direction 200d as the reference in the xy plane. Incidentally, the position (coordinate) information in the terminal coordinate system space is represented by (x, y). In "x", the longitudinal direction of the housing of the tablet terminal 200 is as an axis, and in "y", the normal direction of the back surface of the housing of the tablet terminal 200 is as an axis. Regarding a z direction (transverse direction of the housing of the tablet terminal 200), the illustration and description will be omitted subsequently for simplification of description.

Also, the orientation information in the terminal coordinate system virtual space is represented by d. The orientation information indicates which direction to point on the basis of a coordinate position specified by the position information in the terminal coordinate system virtual space. For simplification of description, it is assumed that only a two-dimensional orientation direction in the xy plane in the terminal coordinate system virtual space is shown.

Incidentally, in the terminal coordinate system virtual space, the reference position 200p of the tablet terminal 200 is the position reference in the terminal coordinate system virtual space, and the normal direction 200d of the center position of the back surface of the housing for the tablet terminal 200 is the orientation reference in the terminal coordinate system virtual space.

Based on the AR object information constituting the AR object 410, the provisional AR object 430 is arranged by converting the position (coordinate) information and orientation information in the absolute coordinate system virtual space so as to correspond to the terminal coordinate system virtual space whose position reference 200p of the tablet terminal 200 is taken as the position reference.

<Provisional AR Object Position Information and Orientation Information Calculation Processing (Tablet Terminal 200)>

Description will be made about the position (coordinate) information and orientation information calculation processing when the provisional AR object 430 is displayed on the display 231 in the processing of S306 in FIG. 14.

The position (coordinate) information of the provisional AR object 430 in the terminal coordinate system virtual space is converted by the following equations (1) and (2).

$$x(obj0)=x(tab0)+\{X(obj0)-X(hmd0)\} \quad (1)$$

$$y(obj0)=y(tab0)+\{Y(obj0)-Y(hmd0)\} \quad (2)$$

where, (x (obj0), y (obj0)): This is position (coordinate) information of the reference position 430p of the provisional AR object 430 in the terminal coordinate system virtual space.

(x (tab0), y (tab0)): This is position (coordinate) information of the reference position 200p of the tablet terminal 200 in the terminal coordinate system virtual space, and is assumed to be the origin (0,0) of the terminal coordinate system virtual space.

(X (obj0), Y (obj0)): This is position (coordinate) information of the reference position 410P of the AR object 410 at the time of executing the AR object fixing processing in the world coordinate system space.

(X (hmd0), Y (hmd0)): This is position (coordinate) information of the reference position 100P of the HMD 100 at the time of executing the AR object fixing processing in the world coordinate system space.

Further, the orientation information 430*d* of the provisional AR object 430 is converted by the following equation (3).

$$d(obj0) = d(tab0) + \{D(obj0) - D(hmd0)\} \quad (3)$$

where, d (obj0): This is orientation information of the provisional AR object 430 in the terminal coordinate system virtual space.

d (tab0): This is orientation information of the tablet terminal 200 in the terminal coordinate system virtual space and is assumed to be the orientation reference and 0 degrees in rotation angle in the terminal coordinate system virtual space.

D (obj0): This is orientation information of the AR object 410 at the time of executing the AR object fixing processing in the world coordinate system space.

D (hmd0): This is orientation information of the HMD 100 at the time of executing the AR object fixing processing in the world coordinate system space.

After executing the AR object fixing processing, even if the positional relationship between the HMD 100 and the AR object 410 in the world coordinate system space changes from the state shown in FIG. 10, it does not affect the display status of the provisional AR object 430 on the tablet terminal 200. That is, even if the AR object 410 deviates from the field of view range U1S via the display 131 of the HMD 100, the provisional AR object 430 continues to be displayed on the display 231 of the tablet terminal 200.

Then, even if the user U1 changes the position of the tablet terminal 200 in the real world after execution of the AR object fixing processing, the display status of the provisional AR object 430 on the display 231 of the tablet terminal 200 (the display position and direction in the display 231) remains unchanged. That is, the provisional AR object 430 is displayed on the display 231 of the tablet terminal 200 while maintaining the relative positional relationship of the state shown in FIG. 15.

Incidentally, the orientation information in the present embodiment is specified by an angle (clockwise direction is made positive) with the Y-axis (y-axis) as the orientation reference for ease of description, but may be other methods such as specifying the end point of a unit vector starting from the reference position, etc.

<Provisional AR Object Edit Processing (Tablet Terminal 200)>

The processing of editing the provisional AR object 430 fixed to the display 231 of the tablet terminal 200 by the AR object fixing processing will be described with reference to FIGS. 16A, 16B, and 17. In the edit processing of the provisional AR object 430, it is possible to perform changing of the shape, display color, and the like of the provisional AR object 430, addition of a comment and the like associated with the provisional AR object 430, etc.

Figure 16A:
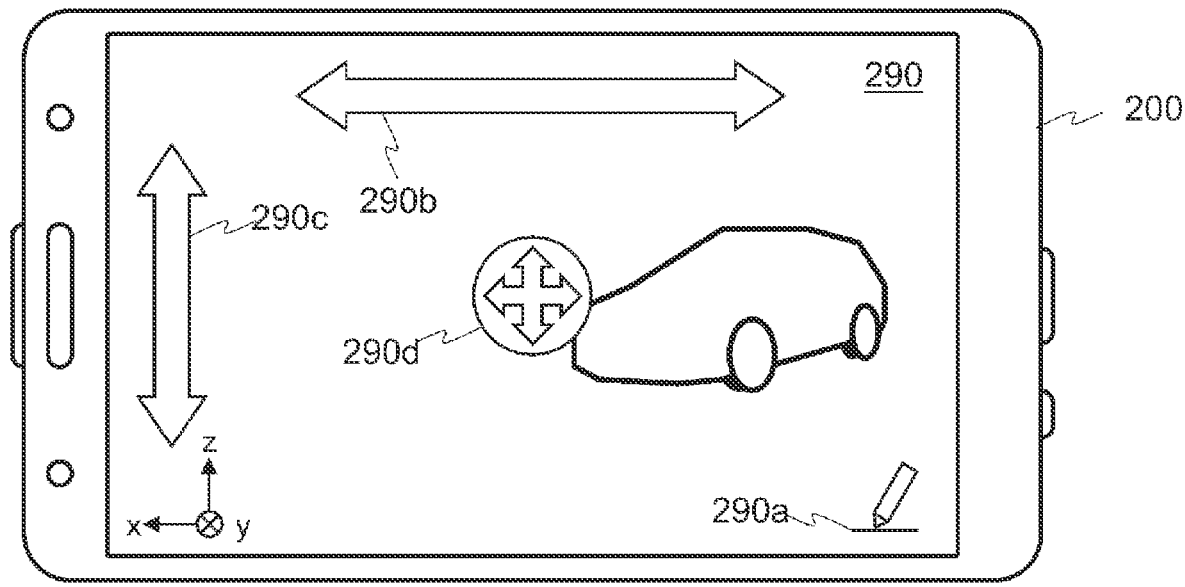
FIG. 16A is a diagram showing a display image of the tablet terminal in the middle of editing a provisional AR object.

FIG. 16A is a diagram showing a display image of the tablet terminal 200 in which the provisional AR object 430 is being edited.

A comment addition icon 290*a*, a horizontal scroll icon 290*b*, a vertical scroll icon 290*c*, and a rotation icon 290*d* are displayed on the display 231.

By tapping the comment addition icon 290*a*, it is possible to add a comment associated with the provisional AR object 430.

By swiping on the horizontal scroll icon 290*b*, the display range of the display 231 can be scrolled in an x-axis direction. Further, by swiping on the vertical scroll icon 290*c*, the display range of the display 231 can be scrolled in a z-axis direction. Thus, it is possible to change the display position of the provisional AR object 430 in the display 231.

By swiping on the rotation icon 290*d*, the provisional AR object 430 can be rotated in a swipe direction.

Figure 16B:
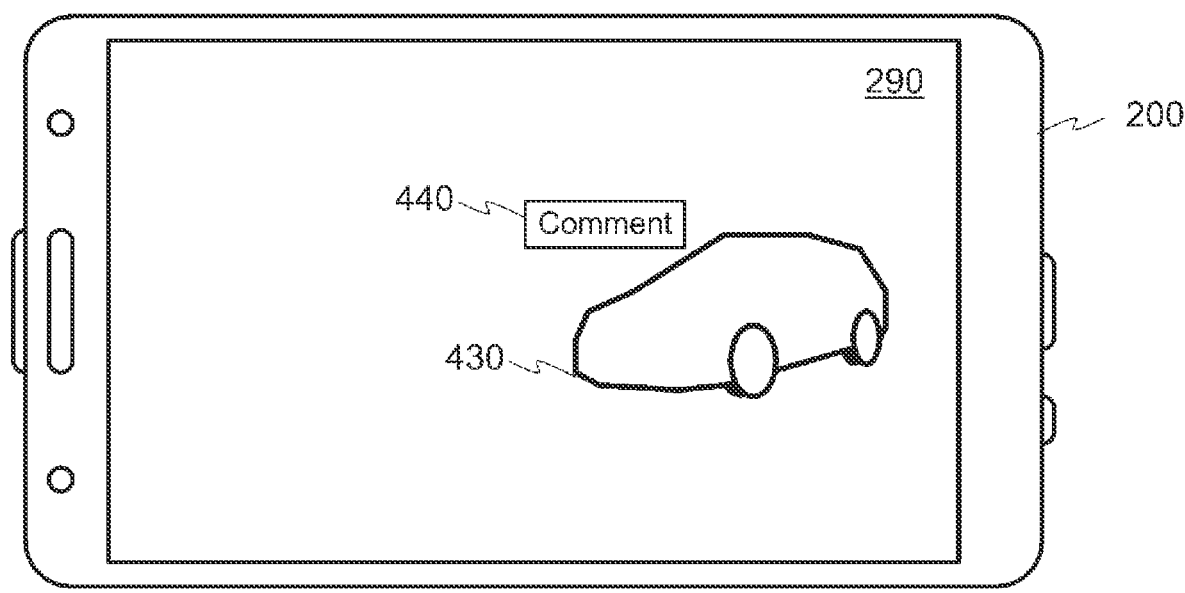
FIG. 16B is a diagram showing a display image of the tablet terminal after editing the provisional AR object.

FIG. 16B is a diagram showing a display image of the tablet terminal 200 after editing the provisional AR object 430.

FIG. 16B shows a state after a provisional added AR object 440 comprised of a comment is added to a desired position in the vicinity of the provisional AR object 430 by the provisional AR object edit processing on the screen under editing in FIG. 16A. Even if changing of the display shape of the provisional AR object 430, addition of a comment or the like associated with the provisional AR object, etc. are performed on the display 231 of the tablet terminal 200, they do not affect the display shape of the original AR object 410 (located in the world coordinate system virtual space) at this point.

While editing the provisional AR object 430, the tablet terminal 200 may transmit a command (AR object non-display request) to the HMD 100 via the communication I/F 270 to suspend the display of the AR object 410 on the display 131 of the HMD 100.

The edit processing of the provisional AR object 430 on the display 231 of the tablet terminal 200 becomes easy.

<Provisional AR Object Edit Result Reflection Processing (Tablet Terminal 200)>

Figure 17:
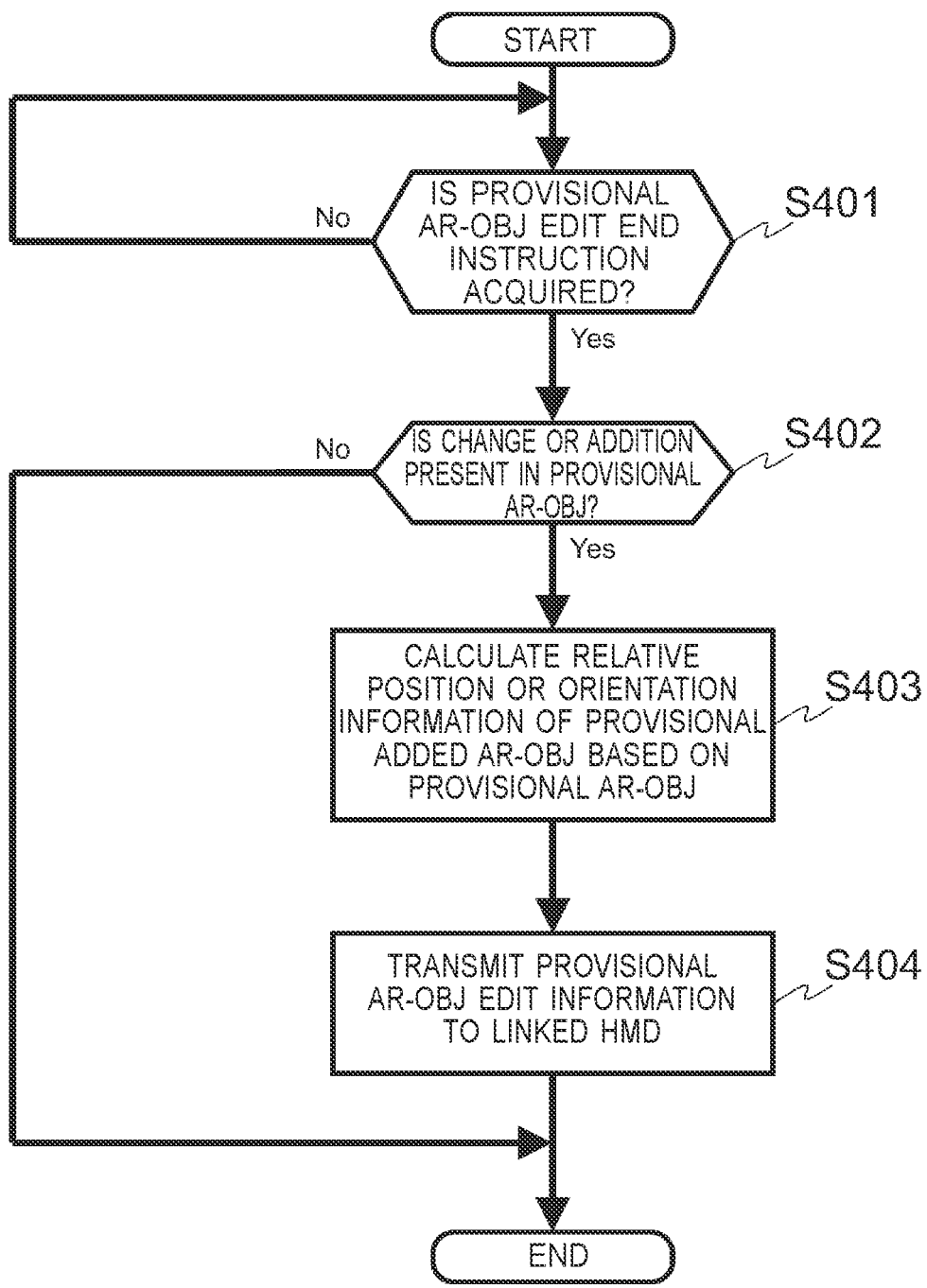
FIG. 17 is a flowchart showing the flow of provisional AR object edit result reflection processing in the tablet terminal.

FIG. 17 is a flowchart showing the flow of processing of reflecting the edit result of the provisional AR object 430 in the tablet terminal 200 on the AR object 410 arranged in the world coordinate system virtual space.

When the basic operation function unit 2101 of the tablet terminal 200 acquires an operation instruction (provisional AR object edit end instruction) (S401: Yes), the object information display control unit 2113 confirms whether or not there is changing the shape, display color, etc. of the provisional AR object, or adding the provisional added AR object (S402). When the basic operation function unit 2101 does not acquire the operation instruction (provisional AR object edit end instruction) (S401: No), S401 is repeated.

When the shape, display color, etc. of the provisional AR object 430 are changed or the provisional added AR object is added (S402: Yes), the object information display control unit 2113 calculates relative position information and relative orientation information of the provisional added AR object 440 (comment), on the basis of the provisional AR object 430 (S403).

The object information display control unit 2113 transmits to the linked HMD 100 as provisional AR object edit information via the communication I/F 270, information on the changing of the shape, display color, etc. made to the provisional AR object 430 and information on the provisional added AR object 440 (comment) added in connection with the provisional AR object 430, and the relative position information and the relative orientation information of the provisional added AR object 440 calculated in the processing of S403 (S404). Then, the provisional AR object edit result reflection processing is terminated.

When the shape, display color, etc. of the provisional AR object 430 are not changed or the provisional added AR object is not added (S402: No), the provisional AR object edit result reflection processing is terminated.

The provisional AR object edit information has only information related to the processing actually made within the processing for changing the shape, display color, etc. to the provisional AR object and the processing for addition of the provisional added AR object.

<Provisional AR Object Edit Result Reflection Processing (HMD 100)>

Figure 18:
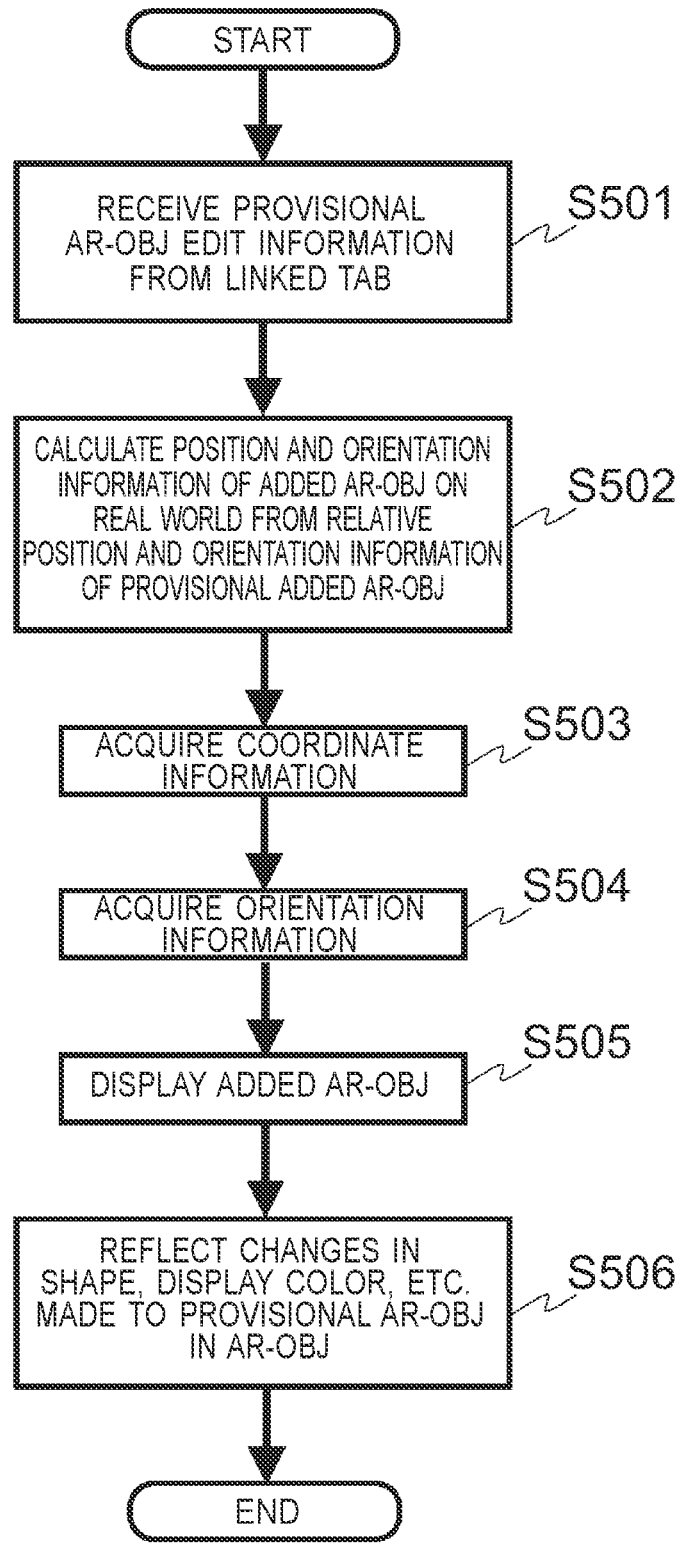
FIG. 18 is a flowchart showing the flow of processing of reflecting the result of edit processing to the provisional AR object performed in the tablet terminal on the AR object in the HMD.

FIG. 18 is a flowchart showing the flow of processing of reflecting the result of edit processing on the provisional AR object 430 performed in the tablet terminal 200 on the AR object 410 in the HMD 100.

The basic operation function unit 1101 of the HMD 100 receives the provisional AR object edit information from the linked tablet terminal 200 via the communication I/F 170 (S501).

The object information display control unit 1114 calculates position information and orientation information for arranging an added AR object in the world coordinate system virtual space, on the basis of the relative position information and the relative orientation information of the provisional added AR object 440 (S502).

The position information calculation unit 1111 calculates position (coordinate) information (X (hmd1), Y (hmd1)) of the HMD 100 in the real world, on the basis of the position information signal acquired from the position information transmitting device 320 via the position sensor 151 (S503).

The orientation information calculation unit 1113 calculates orientation information (D (hmd1)) regarding the direction in which the HMD 100 points in the real world, on the basis of the various information (geomagnetic information, etc.) acquired by the sensor group 160 (S504).

The object information display control unit 1114 arranges in the world coordinate system virtual space, the added AR object configured on the basis of the information about the provisional added AR object 440 in the position and orientation direction on the basis of the position (coordinate) information and orientation information calculated in the processing of S502 (S505).

When the position on the basis of the position information calculated in the above-described processing of S502 is included in the field of view range U1S of the user U1 wearing the HMD 100 set on the basis of the position (coordinate) information calculated in the processing of S503 and the orientation information calculated in the processing of S504, the added AR object is displayed on the display 131. However, when the provisional added AR object 440 is not added to the provisional AR object 430 in the above-mentioned provisional AR object edit processing, the processing of S502 and S505 is unnecessary.

The object information display control unit 1114 changes the shape, display color, etc. of the AR object 410 arranged in the world coordinate system virtual space, on the basis of the information regarding the changing of the shape, display color, etc. performed on the provisional AR object 430 (S506). The AR object 410 that reflects the changes in shape, display color, etc. may be determined by AR object identification information.

Further, when the position on the basis of the current position information of the AR object 410 is included in the field of view range U1S of the user U1 wearing the HMD 100 set on the basis of the position (coordinate) information calculated in the processing of S503 and the orientation information calculated in the processing of S504, the AR object 410 is displayed on the display 131. Incidentally, when there are no changes in the shape, display color, etc. of the provisional AR object 430 in the above-described provisional AR object edit processing, the processing of S506 is unnecessary.

<Added AR Object Position Information and Orientation Information Calculation Processing (HMD 100)>

Figure 19A:
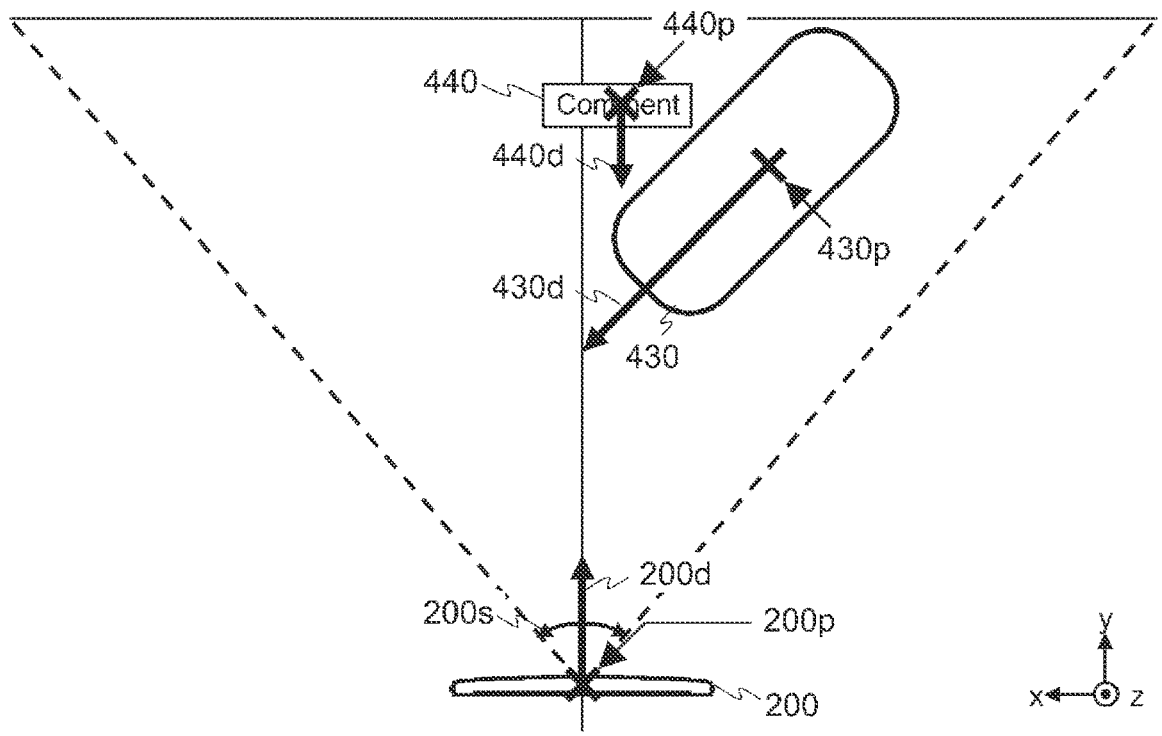
FIG. 19A is a bird's-eye view showing position (coordinate) information and orientation information of a provisional added AR object and the provisional AR object in the terminal coordinate system virtual space.
Figure 19B:
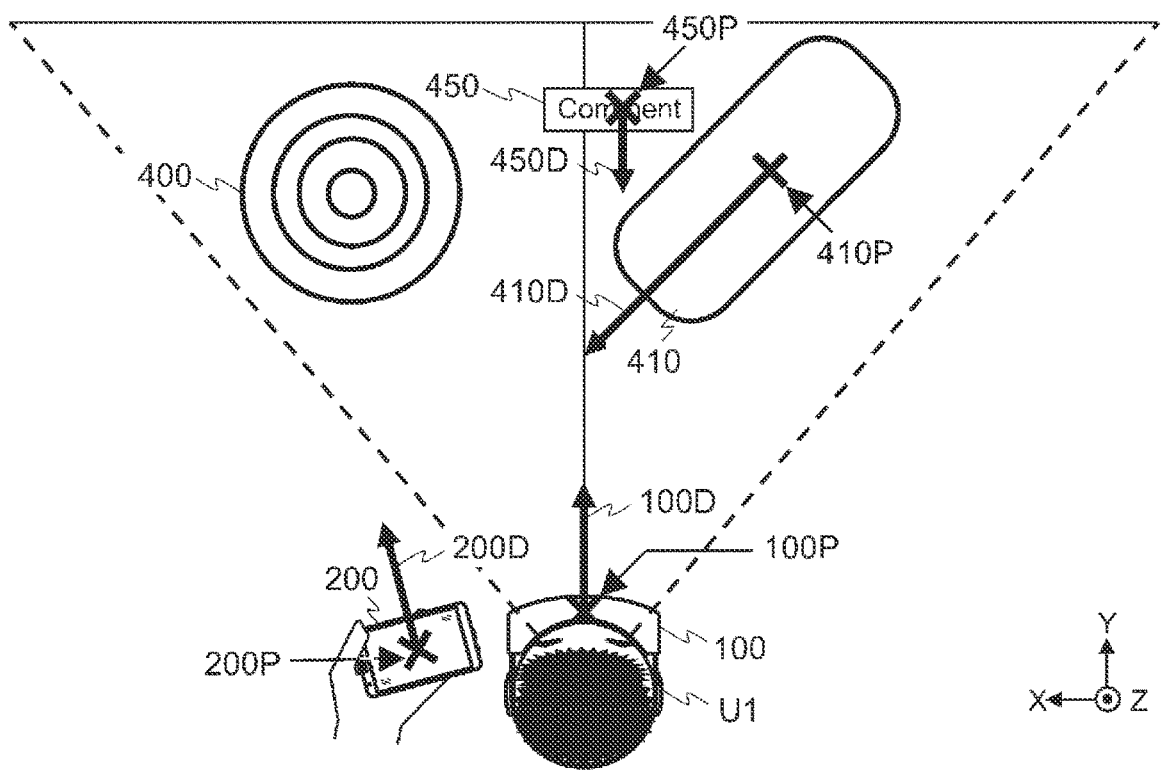
FIG. 19B is a bird's-eye view showing position (coordinate) information and orientation information of an added AR object and an AR object in a world coordinate system virtual space.

FIG. 19A is a bird's-eye view showing position (coordinate) information and orientation information of a provisional added AR object 440 and a provisional AR object 430 in the terminal coordinate system virtual space. FIG. 19B is a diagram showing position (coordinate) information and orientation information of an added AR object 450 and an AR object 410 in the world coordinate system virtual space.

The coordinates of the reference position 200p of the tablet terminal 200 are (x (tab1) y (tab1)), and are set to the coordinates (0, 0) as the position reference in the terminal coordinate system virtual space. Further, the normal direction 200d of the tablet terminal 200 is an orientation reference in the terminal coordinate system virtual space, and the orientation d (tab1) is set to an orientation 0.

In the processing of S502 described above, the position (coordinate) information of the reference position 450P of the added AR object 450 (refer to FIG. 19B) in the world coordinate system virtual space is determined by the following equations (4) and (5).

$$X(com1)=X(obj1)+\{x(com1)-x(obj1)\} \quad (4)$$

$$Y(com1)=Y(obj1)+\{y(com1)-y(obj1)\} \quad (5)$$

where, (X (com1), Y (com1)): This is position (coordinate) information of the reference position 450P (refer to FIG. 19B) of the added AR object 450 in the world coordinate system virtual space.

(X (obj1), Y (obj1)): This is position (coordinate) information of the reference position 410P of the AR object 410 in the world coordinate system virtual space.

(x (com1), y (com1)): This is position (coordinate) information of the reference position 440p (refer to FIG. 19A) of the provisional added AR object 440 in the terminal coordinate system virtual space.

(x (obj1), y (obj1)): This is position (coordinate) information of the reference position 430p (refer to FIG. 19A) of the provisional AR object 430 in the terminal coordinate system virtual space.

Further, the object information display control unit 1114 uses the following equation (6) to convert the orientation information 440d of the provisional added AR object 440 in the terminal coordinate system virtual space into the orientation information of the added AR object 450 in the world coordinate system virtual space.

$$D(com1)=D(obj1)+\{d(com1)-d(obj1)\} \quad (6)$$

where,

D (com1): This is orientation information of the added AR object 450 in the world coordinate system virtual space.

D (obj1): This is orientation information of the AR object 410 in the world coordinate system virtual space.

d (com1): This is orientation information of the provisional added AR object 440 in the terminal coordinate system virtual space.

d (obj1): This is orientation information of the provisional AR object 430 in the terminal coordinate system virtual space.

Even if the position of the AR object 410 in the world coordinate system virtual space at the time of executing the provisional AR object edit result reflection processing is different from the position when the AR object fixing processing is executed, the position information and orientation information of the added AR object 450 are determined on the basis of the position information and orientation information of the AR object 410 at the time of executing the provisional AR object edit result reflection processing.

The AR object 410 that reflects the changes in the shape, display color, etc. to the provisional AR object 430 may be visually recognized only by the user U1 who is the owner of the tablet terminal 200 that has been edited, or may be visible only to a specific user (friend, etc.) designated by the user U1, or may be visible to all users. That is, the AR object 410 reflecting the changes in the shape, display color, etc. to the provisional AR object 430 may be displayed only on the HMD 100 linked with the edited tablet terminal 200, or may be displayed on all HMDs.

<Edit Result Display Processing (HMD 100)>

Figure 20:
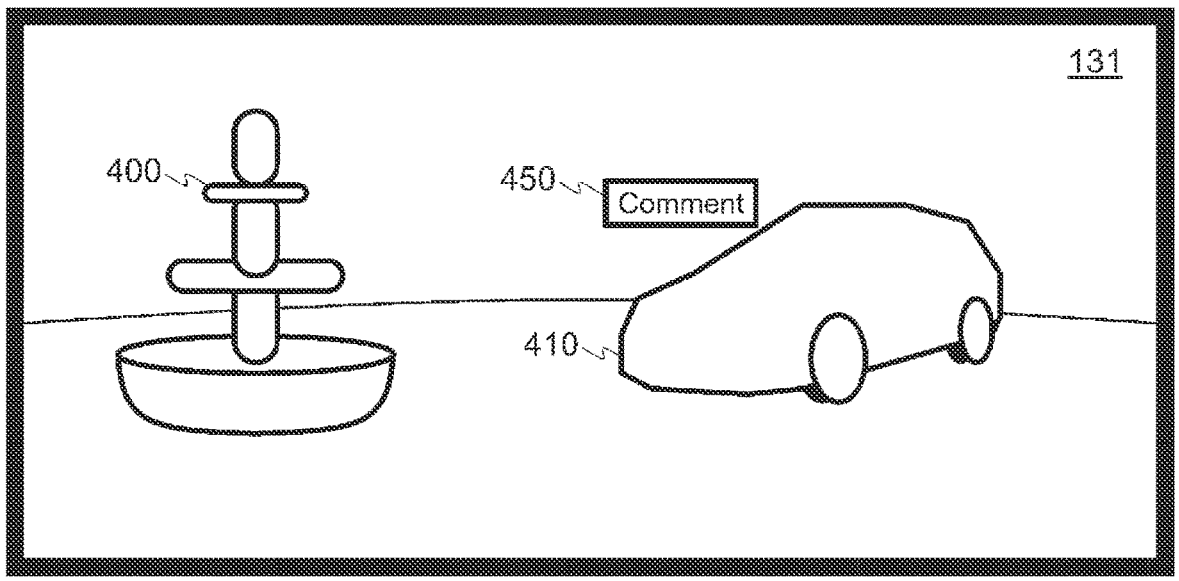
FIG. 20 is a diagram showing a user's field of view through the display of the HMD.

FIG. 20 is a diagram showing the field of view of the user U1 after performing the above-mentioned provisional AR object edit result reflection processing.

In FIG. 20, the AR object display function of the HMD 100 is turned on, and the user U1 visually recognizes a real object in the real world and an AR object arranged in the world coordinate system virtual space. The user U1 visually recognizes the reality object 400 of the fountain through the display 131, and further visually recognizes the AR object 410 of the vehicle and the added AR object 450 comprised of a comment displayed on the display 131. The AR object 410 of the vehicle is displayed on the display 131 according to the position information of the HMD 100. The added AR object 450 consisting of the comment is displayed on the display 131 according to the position information of the HMD 100.

According to the first embodiment, the operation of performing in the HMD 100, the fixing processing (selection operation) on the AR object arranged in the world coordinate system virtual space, transmitting it as the provisional AR object into the terminal coordinate system virtual space with the tablet terminal 200 as the position reference, and editing the provisional AR object with the tablet terminal 200 is performed. When the AR object is transmitted to the tablet terminal 200 and displayed, it is arranged as the provisional AR object in the work space defined in the terminal coordinate system. Since the provisional AR object placed in the work space can continue to be displayed on the tablet terminal 200 without being affected by the fluctuations of the HMD 100, the tablet terminal 200, and the AR object in the world coordinate system space, it is unnecessary to take into consideration the position and orientation of the HMD 100 or the tablet terminal 200 in the world coordinate system space upon performing edit operations such as changing the shape and display color of the provisional AR object, and adding the provisional added AR object related to the provisional AR object. Therefore, it becomes easy to perform the edit operations.

Further, when the edit work is completed, the result of the edit processing performed on the provisional AR object on the tablet terminal 200 is sent to the HMD 100, the position (coordinate) information and orientation information related to the edit processing performed on the terminal coordinate system virtual space are converted into the position (coordinate) information and orientation information in the world coordinate system virtual space, and the result of the edit processing performed on the tablet terminal 200 is reflected in the AR object in the world coordinate system virtual space. Therefore, when the position and orientation in which the AR object is arranged is visually recognized from the HMD 100, the edit processing performed on the provisional AR object provisionally arranged in the terminal coordinate system virtual space on the tablet terminal 200 is reflected in the AR object arranged in the world coordinate system space, and can be stably visually recognized by the HMD 100.

Second Embodiment

The second embodiment is an embodiment in which an added AR object comprised of a comment is added to a reality object comprised of an image of a real object existing in a real space.

<Reality Object Fixing Processing (EMD 100)>

Figure 21A:
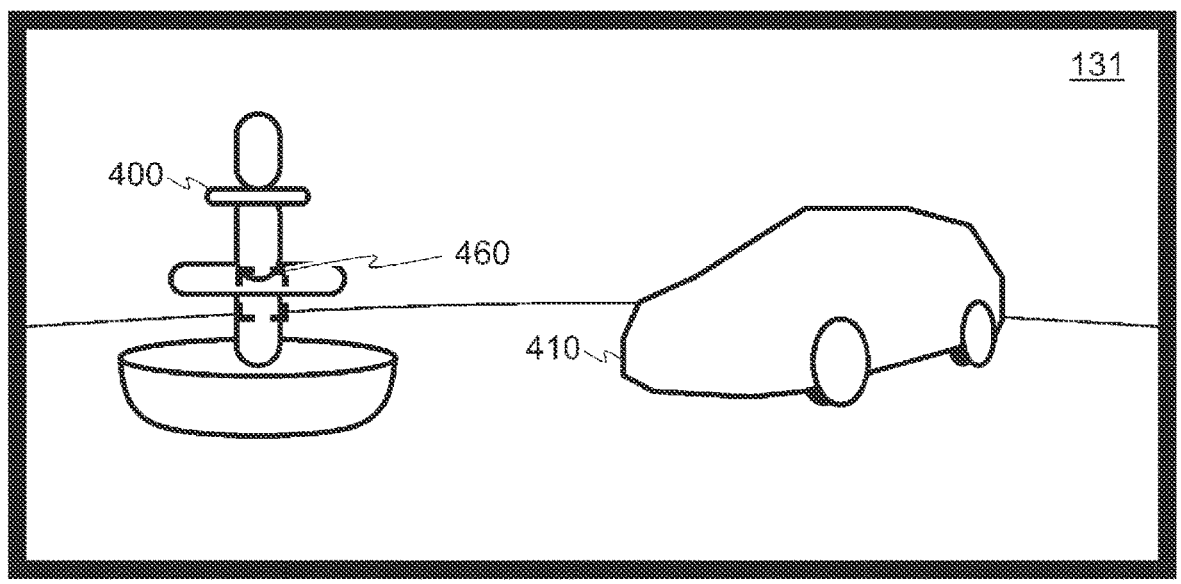
FIG. 21A is a diagram showing a user's field of view through the display of the HMD.

FIG. 21A is a diagram showing the field of view of the user U1 through the display 131 of the HMD 100.

When the user U1 visually recognizes the reality object 400, the object information display control unit 1114 calculates to which position on the display 131 the line-of-sight position 460 of the user U1 corresponds, on the basis of the eye image of the user U1 acquired by the in-camera 134. The line-of-sight position 460 may or may not be displayed on the display 131. When an operation instruction (reality object fixing instruction) is given in a state in which the line-of-sight position 460 is superimposed on the reality object 400 or in a state in which the line-of-sight position 460 is in the vicinity of the reality object 400, the reality object fixing processing is performed.

Figure 21B:
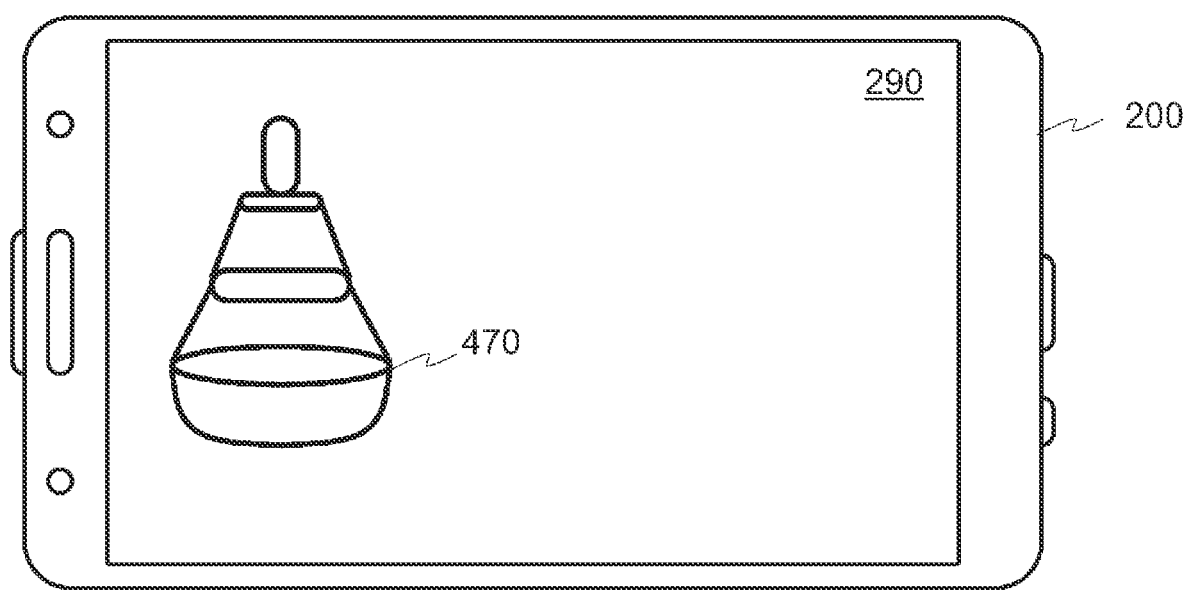
FIG. 21B is a diagram showing an image displayed on the display of the tablet terminal by reality object fixing processing.

FIG. 21B is a diagram showing an image of a provisional object 470 displayed on the display 231 of the tablet terminal 200 by the reality object fixing processing.

The provisional object 470 which is a virtual model of the reality object 400 is displayed on the display 231 of the tablet terminal 200 by the reality object fixing processing. The provisional object 470 is a 3D model of a fountain, and is a 3D model generated on the basis of image information of the reality object 400 of the fountain. The provisional object 470 is generated in response to the operation instruction (reality object fixing instruction) of the user U1 and arranged in the terminal coordinate system virtual space, and is displayed on the display 231.

Figure 22:
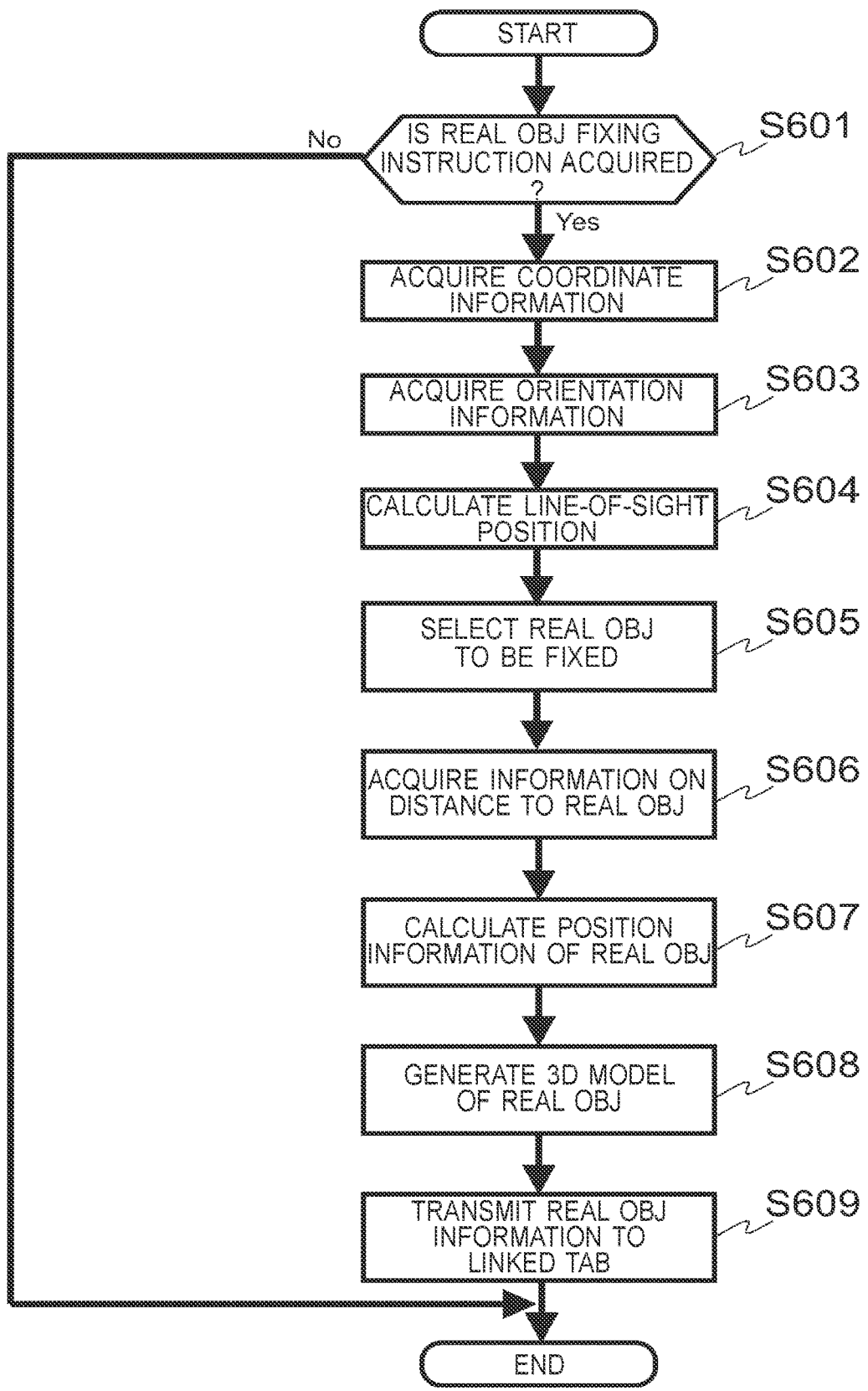
FIG. 22 is a flowchart showing the flow of the reality object fixing processing.

FIG. 22 is a flowchart showing the flow of the reality object fixing processing.

When the user U1 gives the reality object fixing instruction (operation instruction) in a state in which the user U1 visually recognizes the reality object 400 through the display 131 of the HMD 100, the basic operation function unit 1101 acquires the operation instruction (reality object fixing instruction) (S601: Yes) and proceeds to S602. When the user U1 does not give the reality object fixing instruction (operation instruction), and the basic operation function unit 1101 does not acquire the operation instruction (reality object fixing instruction) (S601: No), the processing ends without performing the reality object fixing processing.

As the input operation of the reality object fixing instruction, for example, the following operations may be performed.

1) The touch sensor 122 accepts a touch operation of the user U1.
2) The microphone 143 receives an audio instruction issued from the user U1.
3) A command transmitted from the linked tablet terminal 200 is accepted via the communication I/F 170.

Based on the position information signal acquired from the position information transmitting device 320 via the position sensor 151, the position information calculation unit 1111 calculates position (coordinate) information (X (hmd2), Y (hmd2)) of the HMD 100 in the real world at the time of executing the reality object fixing processing (S602).

Based on various information (geomagnetic information, etc.) acquired by the sensor group 160, the orientation information calculation unit 1113 calculates orientation information (D (hmd2)) regarding the direction in which the HMD 100 at the time of executing the reality object fixing processing is oriented in the real world (S603).

The object information display control unit 1114 calculates to which position on the display 131 the line-of-sight position 460 (refer to FIG. 21A) of the user U1 at the time of executing the reality object fixing processing corresponds, on the basis of an eye image of the user U1 acquired by the in-camera 134 (S604).

The object information display control unit 1114 selects the reality object 400 displayed at the position corresponding to the line-of-sight position 460 of the user U1 calculated in the processing of S604 from within the reality objects displayed on the display 131 (S605: State of FIG. 21A (A)).

The distance measuring sensor 152 measures the distance between the reality object 400 selected in the processing of S605 and the HMD 100 at the time of executing the reality object fixing processing and acquires information on the distance (S606).

The object information display control unit 1114 calculates position (coordinate) information (X (obj2), Y (obj2)) about the reality object 400 selected in the processing of S605 at the time of executing the reality object fixing processing, from the position information and orientation information of the HMD 100 calculated in the processing of S602 and S603, and the distance information about the reality object acquired in the processing of S606 (S607). Further, orientation information D (obj2) regarding the reality object 400 selected in the processing of S605 is set. The orientation information of the reality object 400 sets the direction to point the HMD 100 with the position information (X (obj2), Y (obj2)) as a reference position.

The object information display control unit 1114 generates a 3D model (reality object information) regarding the reality object 400 selected in the processing of S605, on the basis of the distance information about the reality object 400 acquired in the processing of S606 and the reality object image acquired by the out-camera 133 (S608). Incidentally, it is sufficient if the 3D model generated by this processing can be recognized as a position reference when adding a provisional added AR object such as a comment in the provisional object edit processing performed on the tablet terminal 200, and it is not necessary to accurately reproduce the shape of the reality object 400. Further, the reality object information includes the position information and orientation information regarding the reality object calculated in the processing of S607.

The object information display control unit 1114 transmits the reality object information generated in the processing of S608 to the linked tablet terminal 200 via the communication I/F 170 in conjunction with the position information and orientation information of the HMD 100 calculated in the processing of S602 and S603 (S609). This completes the reality object fixing processing in the HMD 100.

<Other Processing>

Since reality object fixing processing and provisional object edit processing performed on the tablet terminal 200, and edit result reflection processing performed on the tablet terminal 200 and the HMD 100, which are other processing for adding an added AR object such as a comment to a reality object consisting of an image of a real object existing in a real space, are similar in outline to the AR object fixing processing, provisional AR object edit processing, and edit result reflection processing described in the first embodiment, dual description thereof will be omitted.

According to the second embodiment, the 3D model of the real object is generated by performing the fixing processing (selection operation) in the HMD 100 on the real object arranged in the real space (world coordinate system space), and is transmitted into the terminal coordinate system virtual space as the provisional object with the tablet terminal 200 as the position reference, whereby the operation of adding the provisional added AR object related to the provisional object with the provisional object as the position reference can be performed with the tablet terminal 200. As a result, by the same operation as in the first embodiment, it is possible to perform an additional operation of an added AR object and display on the HMD 100 even for the real object in the real space.

Third Embodiment

In the third embodiment, the work space is displayed in a virtual pallet area set to a partial area of the display 131 of the HMD 100 instead of the tablet terminal 200, and the operation of editing a provisional AR object is performed there. The above-mentioned virtual pallet area is set in an area for displaying the terminal coordinate system virtual space with the HMD 100 as a position reference, and the remaining area of the display 131 excluding the above-mentioned virtual pallet area is set in an area to visually recognize the world coordinate system space (that is, the inside of the real space and the world coordinate system virtual space in which an AR object is arranged).

<AR Object Fixing Processing>

Figure 23A:
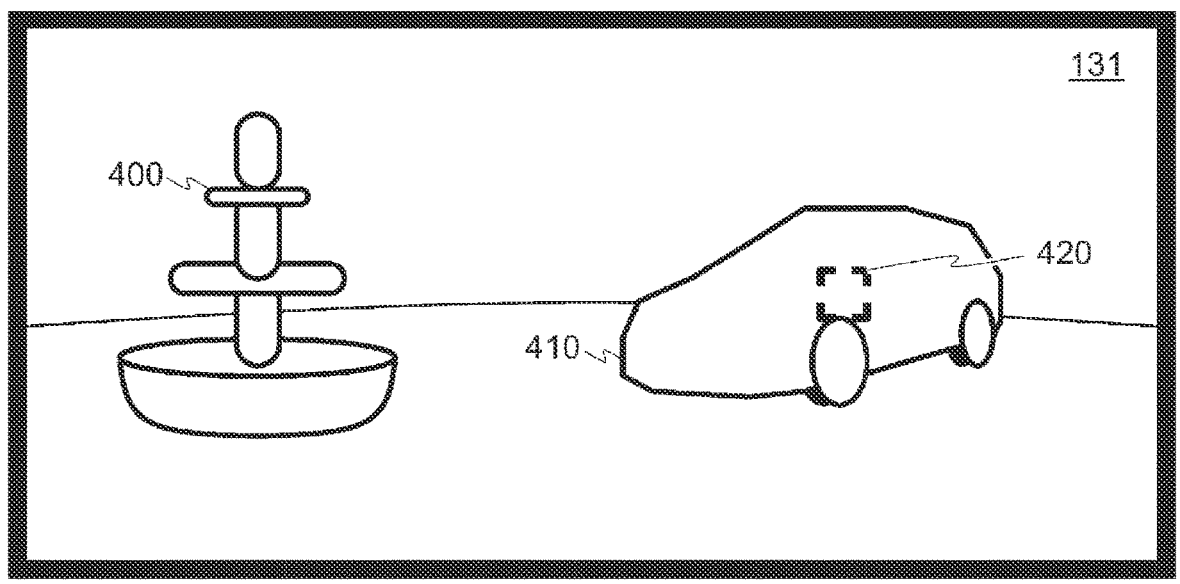
FIG. 23A is a diagram showing a user's field of view through the display of the HMD.

The processing of fixing the AR object 410 to a virtual pallet area 131V of an information display device instead of a linked information processing device will be described with reference to FIG. 23. FIG. 23A is a diagram showing a user's field of view through the display 131 of the HMD 100.

The user is visually recognizing the reality object 400 of the fountain existing in the real world through the display 131. Further, the AR object 410 of the vehicle arranged in the world coordinate system virtual space and displayed on the display 131 is also visually recognized in conjunction therewith. A line-of-sight position mark 420 is a line-of-sight position on the display 131 of the user U1, which is calculated by the object information display control unit 1114 on the basis of the eye image of the user U1 acquired by the in-camera 134. When an AR object fixing instruction is given in a state in which the line-of-sight position of the user U1 is superimposed on the AR object 410, or in a state in which the line-of-sight position of the user U1 is in the vicinity of the AR object 410, the AR object fixing processing is executed.

Figure 23B:
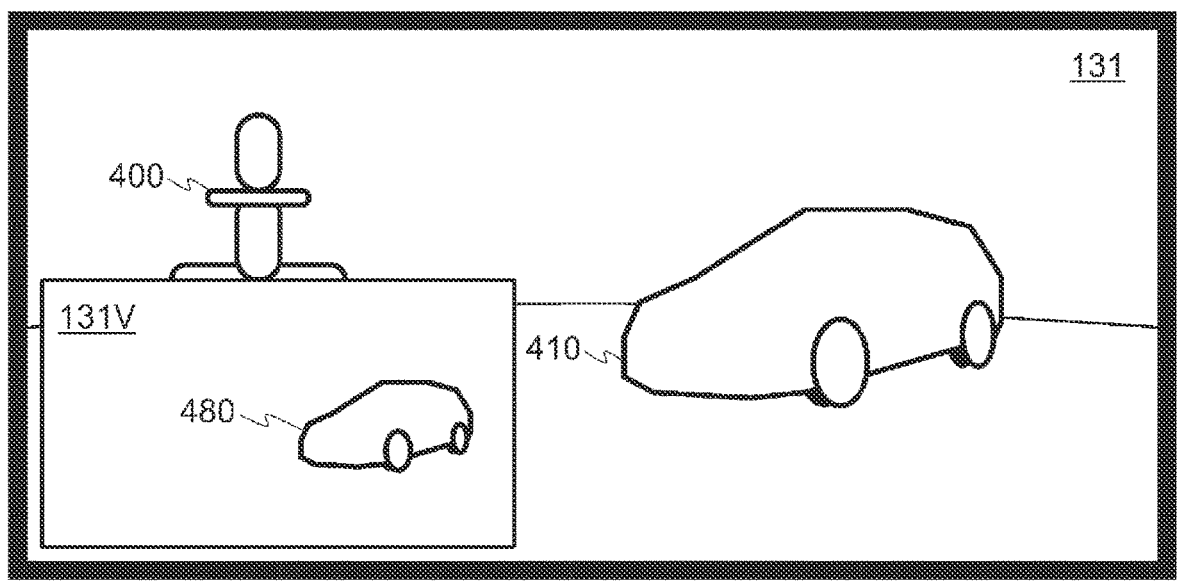
FIG. 23B is a diagram showing a user's field of view through the display of the HMD.

FIG. 23B is a diagram showing a user's field of view through the display 131 of the HMD 100 in a state where a provisional AR object 480 is fixed to the virtual pallet area 131V by the AR object fixing processing. In the AR object fixing processing of the present embodiment, instead of the processing of transmitting AR object information to the information processing device to be linked, a provisional AR object configured on the basis of the AR object information is arranged in the terminal coordinate system virtual space with the HMD 100 as the position reference and displayed in the virtual pallet area 131V.

According to the present embodiment, the virtual pallet area 131V is secured in the display area of the display 131. The virtual pallet area 131V is treated as the terminal coordinate system virtual space (work space) with the HMD 100 as the position reference. Therefore, even if the user U1 changes the orientation direction and the AR object 410 is out of the field of view range U1S (that is, it is in a state of being not displayed on the display 131), the provisional AR object 480 is continuously displayed in the virtual pallet area 131V. By performing the edit work in the virtual pallet area 131V, the tablet terminal 200 becomes unnecessary.

In order to distinguish the virtual pallet area 131V from other display areas of the display 131 (each corresponding to the "virtual space display area" in which the virtual space is displayed), the background color in the virtual pallet area 131V may be a dark color. When the display 131 is a transmissive type display, it becomes easier to work by lowering the transparency to display the real world in the virtual pallet area 131V.

The present invention is not limited to each of the above embodiments, and a part of the configuration of one embodiment can be replaced with another embodiment. It is also possible to add the configuration of another embodiment to the configuration of one embodiment. All of these belong to the category of the present invention, and further the numerical values and messages or the like appearing in the text and figures are also merely examples. Even if different ones are used, the effects of the present invention are not impaired.

Further, the functions and the like of the invention may be implemented by hardware, for example, by designing a part or all of them by an integrated circuit, and the like. Further, they may be implemented by software by interpreting and executing an operation program by a microprocessor unit, a processor, or the like. In addition, the implementation range of the software is not limited, and the hardware and the software may be used together.

For example, while editing a provisional AR object or a provisional added AR object on the tablet terminal 200, the tablet terminal 200 may transmit to the HMD 100, a signal to turn OFF the display function of the AR object, or a signal to turn OFF the display of only an AR object to be edited. Then, when returning the provisional added AR object to the HMD 100, a signal (ON signal) to cancel an OFF signal may be transmitted.

Further, the added AR object is not limited to the comment, but may be any figure, text information, or a combination thereof associated with the AR object.

In addition, since the viewing direction of a three-dimensional comment changes depending on the person, a comment arrangement and a comment arrangement angle with respect to the AR object may be changed according to the viewing angle of the AR object. In this case, as the comment (added AR object) for the AR object, only the position (coordinate) information may be set in the edit processing, and such orientation information as to face the HMD 100 may be automatically set without setting the orientation information. Further, at that time, the comment may be arranged so as to avoid (make visible) the AR object.

LIST OF REFERENCE SIGNS

1: augmented reality processing system
100: HMD
100D: orientation information of HMD in world coordinate system space
100P: reference position of HMD in world coordinate system space
101: processor
102: bus
103: RAM
110: storage
120: operation input device
121: operation key
122: touch sensor
122L: left touch sensor
130: image processing unit
131: display
131V: virtual pallet area
132: image signal processing part
133: out-camera
133L: left out-camera
133R: right out-camera
134: in-camera
140: audio processing unit
141: speaker
141L: left stereo speaker
142: audio signal processing part
143: microphone
151: position sensor
152: distance measuring sensor
160: sensor group
161: gyro sensor
162: geomagnetic sensor
163: acceleration sensor
170: communication I/F
180: extended I/F
200: tablet terminal
200D: orientation information of tablet terminal in world coordinate system space
200P: reference position of tablet terminal in world coordinate system space.
200*d*: orientation information of tablet terminal in terminal coordinate system virtual space
200*p*: reference information of tablet terminal in terminal coordinate system virtual space
200*s*: display range of tablet terminal in terminal coordinate system virtual space
201: processor
202: bus
203: RAM
210: storage
220: operation input device
221: operation key
221P: power supply SW
222: touch sensor
223: touch panel
224: LED
230: image processing unit
231: display
232: image signal processing part
233: out-camera
234: in-camera
235: strobe
240: audio processing unit
241: speaker
241M: monaural speaker
241S: stereo speaker
242: audio signal processing part
243: microphone
243M: monaural microphone
251: position sensor
260: sensor group
261: gyro sensor
262: geomagnetic sensor
263: acceleration sensor
270: communication I/F
271: LAN communication I/F
272: telephone network communication I/F
273: BT communication I/F
280: extended I/F
280U: USB terminal
290: touch screen 290a: comment addition icon
290b: horizontal scroll icon
290c: vertical scroll icon
290d: rotation icon
300: communication network
310: AR object server
320: position information transmitting device
400: reality object
410: AR object
410D: orientation information of AR object in world coordinate system virtual space
410P: reference position of AR object in world coordinate system virtual space
420: line-of-sight position mark
430: provisional AR object
430d: orientation information of provisional AR object in terminal coordinate system virtual space
430p: reference position of provisional AR object in terminal coordinate system virtual space
440: provisional added AR object
440d: orientation information of provisional added AR object in terminal coordinate system virtual space
440p: reference position of provisional added AR object in terminal coordinate system virtual space
450: added AR object
450D: orientation information of added AR object in world coordinate system virtual space
450P: reference position of added AR object in world coordinate system virtual space
460: line-of-sight position mark
470: provisional object
480: provisional AR object
1001: basic operation program
1002: application program
1009: data storage area
1101: basic operation function unit
1111: position information calculation unit
1112: object information acquisition unit
1113: orientation information calculation unit
1114: object information display control unit
1199: temporary storage area
2001: basic operation program
2002: application program
2009: data storage area
2101: basic operation function unit
2111: position information calculation unit
2112: orientation information calculation unit
2113: object information display control unit
2199: temporary storage area
U1: user
U1S: field of view range

The invention claimed is:

1. An augmented reality processing system comprising:
an information display device which displays an augmented reality object; and
an information processing device which is performed an edit operation of the augmented reality object,
wherein the information display device includes a first display, a first communication device which transmits information to the information processing device and receives information from it, and a first processor,
wherein the information processing device includes a second display, a second communication device which transmits information to the information display device and receives information from it, and a second processor,
wherein the first processor transmits information about the augmented reality object arranged in a virtual space on the basis of a world coordinate system with a real space as a reference to the information processing device through the first communication device,
wherein the second processor:
arranges a provisional augmented reality object on the basis of the information about the augmented reality object in a work space on the basis of a terminal coordinate system with the information processing device as a reference, based on first calculated position information calculated from position information of the information display device in a real space and position information of the augmented reality object in the virtual space on the basis of the world coordinate system,
displays the provisional augmented reality object on the second display,
accepts an edit operation for the displayed provisional augmented reality object, and
transmits information about the edit operation for the provisional augmented reality object to the information display device through the second communication device, and
wherein the first processor reflects the content of the edit operation in the augmented reality object arranged in the virtual space on the basis of the world coordinate system, on the basis of the information about the edit operation for the provisional augmented reality object.

2. The augmented reality processing system according to claim 1, wherein, based on identification information capable of identifying the augmented reality object, the first processor reflects the content of the edit operation in the augmented reality object arranged in the virtual space on the basis of the world coordinate system.

3. The augmented reality processing system according to claim 1, wherein the information display device is a head mounted display.

4. The augmented reality processing system according to claim 3, wherein the information processing device is a tablet terminal.

5. The augmented reality processing system according to claim 1, wherein the provisional augmented reality object is an object in which the augmented reality object is displayed in an editable state and is similar to the augmented reality object before accepting the edit operation.

6. The augmented reality processing system according to claim 1, wherein the edit operation is a change of a shape or a display color of the provisional augmented reality object.

7. An augmented reality processing system comprising:
an information display device which displays an augmented reality object; and
an information processing device which is performed an edit operation of the augmented reality object,
wherein the information display device includes a first display, a first communication device which transmits information to the information processing device and receives information from it, and a first processor,
wherein the information processing device includes a second display, a second communication device which transmits information to the information display device and receives information from it, and a second processor,
wherein the first processor transmits information about the augmented reality object arranged in a virtual space on the basis of a world coordinate system with a real space as a reference, to the information processing device through the first communication device, wherein the second processor:

arranges a provisional augmented reality object on the basis of the information about the augmented reality object received through the second communication device, in a work space on the basis of a terminal coordinate system with the information processing device as a reference, based on first calculated position information calculated from the position information of the information display device in the real space and the position information of the augmented reality object in the virtual space on the basis of the world coordinate system, displays the provisional augmented reality object on the second display, accepts an edit operation of adding a provisional added augmented reality object to the displayed provisional augmented reality object, and transmits information indicating a positional relationship between the provisional augmented reality object and the provisional added augmented reality object in the work space, and information about the provisional added augmented reality object to the information display device through the second communication device, and wherein the first processor:

arranges, in the virtual space on the basis of the world coordinate system, an added augmented reality object on the basis of the information about the provisional added augmented reality object, on the basis of the information indicating the positional relationship between the provisional augmented reality object and the provisional added augmented reality object in the work space, and the position information of the augmented reality object in the virtual space on the basis of the world coordinate system, and displays the added augmented reality object on the first display.

8. The augmented reality processing system according to claim 7, wherein the information display device is a head mounted display.

9. The augmented reality processing system according to claim 8, wherein the information processing device is a tablet terminal.

10. The augmented reality processing system according to claim 7, wherein the provisional augmented reality object is an object in which the augmented reality object is displayed in an editable state and is similar to the augmented reality object before accepting the edit operation.

11. The augmented reality processing system according to claim 7, wherein the provisional added augmented reality object is an object comprising of a comment associated with the provisional augmented reality object.

12. An augmented reality processing system comprising:

an information display device which displays an augmented reality object; and an information processing device which is performed an edit operation of the augmented reality object, wherein the information display device includes a first display, a first communication device which transmits information to the information processing device and receives information from it, a distance measuring sensor which measures a distance from the information display device to a real object existing in a real space, and a first processor, wherein the information processing device includes a second display, a second communication device which transmits information to the information display device and receives information from it, and a second processor, wherein the first processor:

calculates position information of a reality object comprised of an image of the real object in the virtual space on the basis of the world coordinate system, based on the distance to the real object measured by the distance measuring sensor and the position information of the information display device in the real space, and transmits information about the reality object to the information processing device through the first communication device, wherein the second processor:

arranges a provisional augmented reality object on the basis of the information about the reality object received through the second communication device, in a work space on the basis of a terminal coordinate system with the information processing device as a reference, based on first calculated position information calculated from the position information of the information display device in the real space and the position information of the reality object in the virtual space on the basis of the world coordinate system, displays the provisional augmented reality object on the second display, accepts an edit operation of adding a provisional added augmented reality object to the displayed provisional augmented reality object, and transmits information indicating a positional relationship between the provisional augmented reality object and the provisional added augmented reality object in the work space, and information about the provisional added augmented reality object to the information display device through the second communication device, and wherein the first processor:

arranges, in the virtual space on the basis of the world coordinate system, an added augmented reality object on the basis of the information about the provisional added augmented reality object, on the basis of the information indicating the positional relationship between the provisional augmented reality object and the provisional added augmented reality object in the work space, and the position information of the reality object in the virtual space on the basis of the world coordinate system, and displays the added augmented reality object on the first display.

13. The augmented reality processing system according to claim 12, wherein the information display device is a head mounted display.

14. The augmented reality processing system according to claim 13, wherein the information processing device is a tablet terminal.

15. The augmented reality processing system according to claim 12, wherein the provisional augmented reality object is an object in which the augmented reality object is displayed in an editable state and is similar to the augmented reality object before accepting the edit operation.

16. The augmented reality processing system according to claim 12, wherein the provisional added augmented reality object is an object comprising of a comment associated with the provisional augmented reality object.

* * * * *